(12) United States Patent
Norieda

(10) Patent No.: US 8,319,727 B2
(45) Date of Patent: Nov. 27, 2012

(54) INPUT DEVICE, INFORMATION TERMINAL PROVIDED WITH THE SAME AND INPUT METHOD

(75) Inventor: Shin Norieda, Tokyo (JP)

(73) Assignee: NEC Corporation, Tokyo (JP)

( * ) Notice: Subject to any disclaimer, the term of this patent is extended or adjusted under 35 U.S.C. 154(b) by 233 days.

(21) Appl. No.: 12/808,031

(22) PCT Filed: Dec. 12, 2008

(86) PCT No.: PCT/JP2008/072617
§ 371 (c)(1),
(2), (4) Date: Jun. 14, 2010

(87) PCT Pub. No.: WO2009/078350
PCT Pub. Date: Jun. 25, 2009

(65) Prior Publication Data
US 2010/0265170 A1 Oct. 21, 2010

(30) Foreign Application Priority Data

Dec. 17, 2007 (JP) .................................. 2007-324244
Mar. 3, 2008 (JP) .................................. 2008-051866
Jun. 26, 2008 (JP) .................................. 2008-166853

(51) Int. Cl.
*G09G 5/00* (2006.01)
(52) U.S. Cl. ....................................................... 345/156
(58) Field of Classification Search .......... 345/156–178; 178/18.01–18.09, 18.11; 463/36–39
See application file for complete search history.

(56) References Cited

U.S. PATENT DOCUMENTS

| 2001/0040550 A1* | 11/2001 | Vance et al. ................... 345/156 |
| 2004/0021633 A1* | 2/2004 | Rajkowski ..................... 345/156 |
| 2004/0140956 A1* | 7/2004 | Kushler et al. ................. 345/168 |

FOREIGN PATENT DOCUMENTS

| JP | 2-278321 A | 11/1990 |
| JP | 11-119882 A | 4/1999 |
| JP | 2004537802 A | 12/2004 |
| JP | 2005258734 A | 9/2005 |
| JP | 2005301874 A | 10/2005 |

OTHER PUBLICATIONS

International Search Report for PCT/JP2008/072617 mailed Mar. 10, 2009.

* cited by examiner

*Primary Examiner* — Stephen Sherman

(57) ABSTRACT

In an input device used in mobile apparatuses in which portability is considered important and in mobile apparatuses in which a display unit such as a display is considered important, even if an input unit of the apparatus is made small in size, the input device is configured so that an input can be carried out without requiring an operator for skill. The input device is provided with the input unit including a detecting unit that, when a part of a living body in contact with the input device is pushed, detects a force transmitted through the living body and outputs detection data, and an input information specifying module that, when receiving the detection data, refers to stored data at a database, specifies a position where the living body is pushed, and outputs data allotted to the position as input information of electronic data.

18 Claims, 47 Drawing Sheets

FIG.10

| INPUT INFORMATION SPECIFIED DATA | LOWER THRESHOLD VALUE | UPPER THRESHOLD VALUE |
|---|---|---|
| ⋮ | ⋮ | ⋮ |
| MA | 0 | 0.6 |
| YA | 0.7 | 1.2 |
| RA | 1.7 | 2.1 |
| ⋮ | ⋮ | ⋮ |

FIG.13

|  | FIRST INPUT AREA | SECOND INPUT AREA | THIRD INPUT AREA |
|---|---|---|---|
| MEAN VALUE $\mu$ STANDARD DEVIATION $\sigma$ | -1.184 0.332 | -0.334 0.267 | 0.703 0.296 |
| LOWER THRESHOLD VALUE UPPER THRESHOLD VALUE | -1.516 -0.853 | -0.600 -0.067 | 0.406 0.999 |

FIG.14

|  | FIRST INPUT AREA | SECOND INPUT AREA | THIRD INPUT AREA |
|---|---|---|---|
| MEAN VALUE $\mu$<br>STANDARD DEVIATION $\sigma$ | -1.184<br>0.332 | -0.334<br>0.267 | 0.703<br>0.296 |
| $\mu-2\sigma$<br>$\mu+2\sigma$ | -1.848<br>-0.521 | -0.867<br>0.199 | 0.110<br>1.296 |
| LOWER THRESHOLD VALUE<br>UPPER THRESHOLD VALUE | -1.848<br>-0.694 | -0.694<br>0.155 | 0.155<br>1.296 |

FIG.15

|  | FIRST INPUT AREA | SECOND INPUT AREA | THIRD INPUT AREA |
|---|---|---|---|
| RELIABLE RANGE: THRESHOLD VALUES BASED ON $\mu \pm \sigma$ | △ | △ | △ |
| RELIABLE RANGE: THRESHOLD VALUES BASED ON $\mu \pm 2\sigma$ | ◎ | ○ | ◎ |

1₁₁ FIRST INPUT AREA RADIUS SIDE
1₁₂ FIRST INPUT AREA ULNA SIDE
1₂₁ SECOND INPUT AREA RADIUS SIDE
1₂₂ SECOND INPUT AREA ULNA SIDE
1₃₁ THIRD INPUT AREA RADIUS SIDE
1₃₂ THIRD INPUT AREA ULNA SIDE

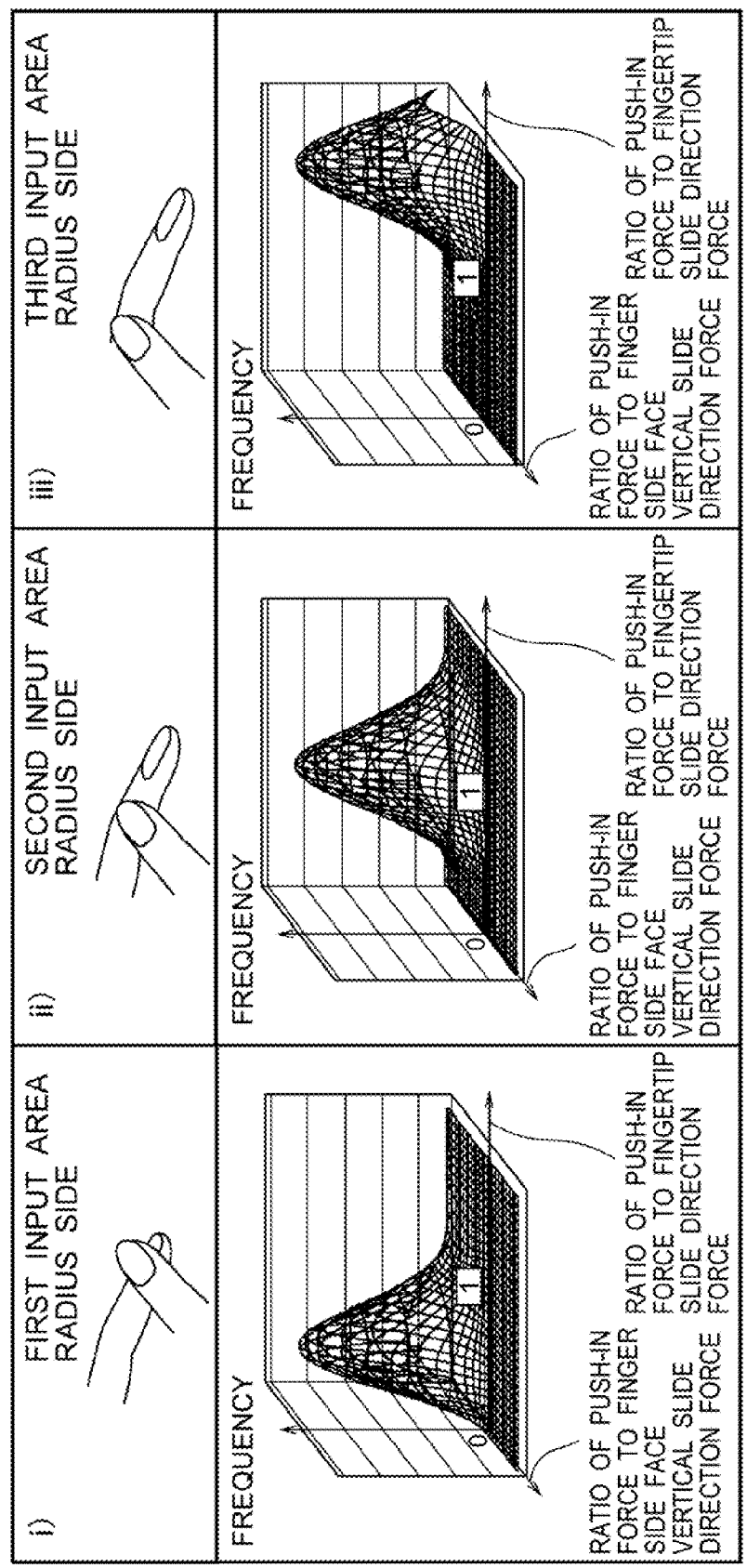

FIG.25

| INPUT AREA | RATIO OF PUSH-IN FORCE TO FINGER SIDE FACE VERTICAL SLIDE DIRECTION FORCE | | RATIO OF PUSH-IN FORCE TO FINGERTIP SLIDE DIRECTION FORCE |
|---|---|---|---|
| | LOWER THRESHOLD VALUE | UPPER THRESHOLD VALUE | THRESHOLD VALUE |
| ⋮ | ⋮ | ⋮ | ⋮ |
| FIRST INPUT AREA RADIUS SIDE | 0 | 0.6 | 0> |
| SECOND INPUT AREA RADIUS SIDE | 0.7 | 1.2 | 0> |
| THIRD INPUT AREA RADIUS SIDE | 1.7 | 2.1 | 0> |
| ⋮ | ⋮ | ⋮ | ⋮ |

FIG. 26

| INPUT ACTIONS | | TIME-SERIES DATA | CHANGE IN INPUT AREAS |
|---|---|---|---|
| i) LEFT-DIRECTION TRACING ACTION | | PUSH-IN DIRECTION / FINGERTIP SLIDE DIRECTION / FINGER SIDE FACE VERTICAL SLIDE DIRECTION (RADIUS-SIDE AREA, ULNA-SIDE AREA) | SECOND INPUT AREA RADIUS SIDE ⇧ SECOND INPUT AREA ULNA SIDE |
| ii) RIGHT-DIRECTION TRACING ACTION | | PUSH-IN DIRECTION / FINGERTIP SLIDE DIRECTION / FINGER SIDE FACE VERTICAL SLIDE DIRECTION (ULNA-SIDE AREA, RADIUS-SIDE AREA) | SECOND INPUT AREA ULNA SIDE ⇧ SECOND INPUT AREA RADIUS SIDE |
| iii) FINGERTIP-DIRECTION TRACING ACTION | | PUSH-IN DIRECTION / FINGERTIP SLIDE DIRECTION / FINGER SIDE FACE VERTICAL SLIDE DIRECTION (THIRD INPUT AREA, SECOND INPUT AREA, FIRST INPUT AREA) | THIRD INPUT AREA ⇧ SECOND INPUT AREA ⇧ FIRST INPUT AREA |
| iv) FINGER-BASE-DIRECTION TRACING ACTION | | PUSH-IN DIRECTION / FINGERTIP SLIDE DIRECTION / FINGER SIDE FACE VERTICAL SLIDE DIRECTION (FIRST INPUT AREA, SECOND INPUT AREA, THIRD INPUT AREA) | FIRST INPUT AREA ⇧ SECOND INPUT AREA ⇧ THIRD INPUT AREA |

FIG.33

|  |  | THIRD INPUT AREA | SECOND INPUT AREA | FIRST INPUT AREA |
|---|---|---|---|---|
| MEAN VALUE $\mu$ | | 0.417 | 0.558 | 0.717 |
| STANDARD DEVIATION $\sigma$ | | 0.027 | 0.023 | 0.332 |
| LOWER THRESHOLD VALUE | $\mu - 2\sigma$ | 0.362 | 0.511 | 0.668 |
| UPPER THRESHOLD VALUE | $\mu + 2\sigma$ | 0.472 | 0.604 | 0.767 |

FIG.34

|  | FIRST INPUT AREA | SECOND INPUT AREA | THIRD INPUT AREA |
|---|---|---|---|
| RELIABLE RANGE: THRESHOLD VALUES BASED ON $\mu \pm 2\sigma$ | ◎ | ◎ | ◎ |

NPUT AREA POSITIONS × DETECTING UNIT POSITIONS

INPUT DEVICE, INFORMATION TERMINAL PROVIDED WITH THE SAME AND INPUT METHOD

This application is the National Phase of PCT/JP2008/072617, filed Dec. 12, 2008, which claims the Priority right based on Japanese Patent Application No. 2007-324244 filed on Dec. 17, 2007, Japanese Patent Application No. 2008-051866 filed on Mar. 3, 2008, and Japanese Patent Application No. 2008-166853 filed on Jun. 26, 2008, and the disclosures thereof are hereby incorporated by reference in the entirety.

TECHNICAL FIELD

The present invention relates to an input device, an information terminal provided with the same, and an input method. More specifically, the present invention relates to an input device and an input method, which can be applied to mobile apparatuses such as mobile telephones, PDAs, and notebook PCs.

BACKGROUND ART

For input devices used in mobile apparatuses in which portability is considered important and in mobile apparatuses in which a display unit such as a display is considered important, there have been desired input devices with small input unit on the apparatuses.

As a method for reducing a key layout space of the input unit on the apparatus, there is considered a method which allots a plurality of functions to a single input. As an example thereof, there is a method which places a joystick on the apparatus for detecting tilt angles in the top-and-bottom and right-and-left directions, and switches characters according to the tilt directions (e.g., see Patent Document 1). However, the tilt directions of the joystick of this method used for inputting each character is different from a widely-used mobile apparatus input method, so that it is required to be accustomed thereto for the input. Since input operations become complicated, input errors may be induced.

Further, there is also a method with which a detecting unit is separated from the apparatus and placed independently. As an example thereof, there is a device with which input is done by having a detecting unit attached to the body (e.g., see Patent Document 2). However, with this method, it is necessary to prepare an input unit separately from the apparatus, and it is not excellent in terms of portability. Further, it is a troublesome work to attach the detecting unit to an operator.

Furthermore, as a method for reducing the space of the input unit for detecting actions to the surface of the apparatus, there is a method which inputs characters with handwriting through detecting digital compressions in X-, Y-, and Z-axis directions. As a conventional example thereof, there is a method which uses a track point, and inputs characters with handwriting from the digital compression changing pattern (e.g., see Patent Document 3) However, it is difficult to check the action since there is no movement in the fingertip that conducts the input action, and it may cause input errors.

Patent Document 1: Japanese Unexamined Patent Publication 2005-258734
Patent Document 2: Japanese Patent Application Publication 2004-537802
Patent Document 3: Japanese Unexamined Patent Publication 2005-301874

DISCLOSURE OF THE INVENTION

Problems to be Solved by the Invention

An issue of Patent Document 1 is that it is necessary to accustomed to input operations because there is an increase in input errors since the operation system thereof is complicated and a delicate operation of the apparatus is required due to the fact that a plurality of functions are allotted to a small input area, and input operations different from those of character input and the like via numeric keys that are often used in conventional mobile apparatuses are required.

Further, an issue of Patent Document 2 is that it requires the input unit separately from the apparatus, so that it is not excellent in terms of portability. Further, it requires a troublesome work of attaching the detecting unit to the operator. It is an obstacle when the operator does not conduct input operations, and the operator needs to go through the troublesome work of wearing it when it is detached.

Furthermore, an issue of Patent Document 3 is that it is difficult to check the action with the method which uses the track point and inputs characters with handwriting from the digital compression changing pattern, and it may cause input errors.

An object of the present invention is to provide, as an input device used in mobile apparatuses in which portability is considered important and in mobile apparatuses in which a display unit such as a display is considered important, a user-friendly input device with which checking of the operators actions can be done easily and whose occupying area of its input unit on the apparatus is narrow.

Means for Solving the Problems

In order to achieve the foregoing object, the input device according to the present invention is an input device with which a detecting unit is touched by a part of a body, the vicinity of a contact part of the body is pushed in, a push-in position thereof is specified, and data corresponding to the push-in position is outputted. The input device includes: the detecting unit which detects a force transmitted via the body when a part of the body is in contact therewith and the vicinity of the contact part of the body is pushed in, and outputs it as detection data; and an input information specifying module which specifies the push-in position upon receiving the detection data, and outputs it as input information specified data corresponding to the push-in position.

In order to achieve the foregoing object, the input device according to the present invention is an input device with which a detecting unit is touched by a part of a body, the vicinity of a contact part of the body is traced (the vicinity of the contact part of the body at a part different from the contact part of the body is slid), a slide region and a slide direction are specified, and data corresponding to the slide region and the slide action is outputted. The input device includes: the detecting unit which detects a force transmitted via the body when a part of the body is in contact therewith and the vicinity of the contact part of the body is traced, and outputs it as detection data; and an input information specifying module which specifies the traced region and the tracing action upon receiving the detection data, and outputs it as input information specified data corresponding to the trace region and the trace action.

In order to achieve the foregoing object, the input method according to the present invention is an input method which includes: a step which has a part of a body touch a detecting unit of an input device, and has the vicinity of a contact part of the body pushed in; a step which detects a force transmitted to the detecting unit via the body, and outputs it as detection data; and an input information specifying step which specifies a push-in position upon receiving the detection data, and outputs it as input information specified data based on the push-in position.

In order to achieve the foregoing object, the input method according to the present invention is an input method which includes: a step which has a part of a body touch a detecting unit of an input device, and has the vicinity of a contact part of the body traced; a step which detects a force transmitted to the detecting unit via the body, and outputs it as detection data; and an input information specifying step which specifies a traced region and a tracing action upon receiving the detection data, and outputs it as input information specified data based on the tracing action.

In the present invention, there is provided the input area that is divided into each area so that the position to which a part of the body that is in contact with the apparatus is pushed in can be discriminated. When a part of the body is pushed in, the pushing force is propagated via the body, and the apparatus side outputs detection data upon detecting that force.

Upon receiving the detection data, the input information specifying module specifies the push-in position based on the physical features and the structural features such as the bone structure of the body, muscles, tendons, joints, and skin, and outputs it as input information specified data based on the push-in position.

Effects of the Invention

With the present invention, the pushing force used for the input actions is propagated via the body that is in contact with the apparatus, and it is divided into the push-in direction and slide direction. Thus, the push-in position can be specified by detecting the balance of the force or by detecting the force in one direction, so that it is possible to allot the input area where the input operation is conducted to a part of the body that is in contact with the input apparatus. This makes it possible to reduce the number of detecting units on the apparatus, so that the layout area thereof can be narrowed. Compared to the case of providing the input area on the widely-used apparatus and reducing the size thereof, a sufficiently large area can be secured by allotting the input area for conducting the operation to a part of the body. Therefore, it is possible to prevent the input errors.

Further, divided sections of the input area can be allotted in the same manner as those of the numeric keys used often in the widely-used mobile apparatuses, so that no skill is required for the input. Furthermore, the detecting unit for detecting the input is on the apparatus, so that there requires no troublesome work of winding the detecting member around the body.

BEST MODES FOR CARRYING OUT THE INVENTION

Next, exemplary embodiments of the invention will be described in details by referring to the drawings.

An input device according to the exemplary embodiments of the invention is an input device which outputs input information of electronic data corresponding to a physical quantity by detecting the physical quantity applied to a living body as electric signals. As the basic structure as shown in FIG. 1, FIG. 16, FIG. 21, FIG. 27, FIG. 35, and FIG. 39, the input device is characterized to include: a detecting unit 2 which outputs the physical quantity applied to the living body as analog-quantity detection data; and an input information specifying module 5 which collates data accumulated in a database 4 with the detection data, and outputs input information of electronic data corresponding to the physical quantity based on the collation result thereof.

This exemplary embodiment of the invention uses the detecting unit 2 to output the physical quantity applied to the living body as the analog-quantity detection data, and uses the input information specifying module 5 to collate the data accumulated in the database with the detection data and to output input information of electronic data corresponding to the physical quantity based on the collation result thereof.

Next, the input device according to the exemplary embodiments of the invention will be described in more details based on a specific example.

First Exemplary Embodiment

FIG. 1A is a block diagram showing the structure of the input device according to a first exemplary embodiment of the invention. The input device according to the exemplary embodiment shown in FIG. 1A is an example which uses: as the detecting unit 2, a unit which specifies the position in the living body to which the physical quantity is applied and outputs the physical quantity at that position as the analog-quantity detection data; and as the input information specifying module 5, a module which collates the data accumulated in the database 4 with the detection data, and outputs the data allotted to the position by corresponding to the physical quantity as the input information of the electronic data based on the collation result thereof.

Next, the first exemplary embodiment of the invention will be described. As shown in FIG. 1A, the input device of the exemplary embodiment is structured with: an input unit 3 having a plurality of detecting units 2 located at positions to be in contact with fingertips that conduct input, which output detection data a upon detecting a force; and the input information specifying module 5 which compares the data a with accumulated data b in the database 4 set in advance to specify the push-in position upon receiving the detection data a, and outputs data allotted to that position as the input information of electronic data (referred to as input information specified data c hereinafter).

FIG. 2 is a perspective view showing a state where input is conducted to the detecting units 2 of the input unit 3. As shown in FIG. 2, the input unit 3 includes four detecting units 2 to which the fingertips of the thumb, forefinger, middle finger, and third finger make contact, and a single to three input areas 1 are set to each finger. The input areas 1 are set on the bones between joints, for example, and those input areas 1 are pushed in by the fingertip of the right hand when the fingertips of the left hand make contact with the detecting units 2. The detecting units 2 to which the fingertips of the forefinger, the middle finger, and the third finger make contact have a function of outputting detection data according to the positions of the input areas 1 that are pushed in, when those are pushed in by the fingertips.

As shown in FIG. 2, ten input areas 1 in total are set in this exemplary embodiment, and symbols (data) of "a" column to "wa" column of the kana syllabary are allotted to each input area 1. For example, when the input area 1 marked as "ma" is pushed in once, it is judged that kana character "ma" is inputted. It is judged that "mi" is inputted when the character "ma" is pushed in twice continuously, judged as "mu" when "ma" is pushed in three times continuously, judged as "me" when "ma" is pushed in four times continuously, and judged as "mo" when "ma" is pushed in five times continuously. Further, it is judged that wa" is inputted when the character "wa" is pushed in once, judged as "wo" when "wa" is pushed in two times continuously, and judged as "n" when "wa" is pushed in three times continuously.

FIG. 3 is a sectional view showing the structure of the detecting unit 2. As shown in FIG. 3, the detecting unit 2 is structured with: a key top $2_1$ which actually conducts push-in action when the fingertip of the operator touches the apparatus; and a force sensor $2_2$ placed underneath the key top $2_1$, which is capable of detecting directions of two components, i.e., the force pushing in from the face in contact with the fingertip towards the vertical direction and the force sliding in the horizontal direction. The output thereof is taken out via a wiring board 7 placed underneath the force sensor $2_2$. Note that "8" is a casing of the apparatus, and "9" is a base placed inside the apparatus.

The input information specified data c outputted from the input device shown in FIG. 1A may be displayed on a screen by structuring the input device as in FIG. 1B, for example, and inputting the data to an information presenting module 6. In that case, when it is judged by the input information specifying module 5 that a specific character, e.g., character of "wa", is inputted from the input unit 3 shown in FIG. 2, that character is displayed on the information presenting module 6.

(Actions)

Next, actions of the input device according to the exemplary embodiment will be described by referring to FIG. 1-FIG. 10. FIG. 4 is a flowchart showing the actions of the input device according to the exemplary embodiment. As shown in FIG. 4, first, when the finger whose fingertip is in contact with the apparatus is pushed in, the force sensor $2_2$ of the detecting unit 2 detects the force pushing in the contact face of the fingertip to the vertical direction and the force sliding in the horizontal direction, and outputs the force of the components of the two directions configured with pushing-in data and slide data as the detection data a in step S101. In a next step S102, the detection data a and the accumulated data b saved in the database 4 in advance are compared to specify which of the input areas 1 is being pushed in, and the result is outputted as the input information specified data c.

At last, in step S103, the information presenting module 6 receives the input information specified data c that is specified by the input information specifying module 5, and presents a prescribed symbol allotted to each input position, data, or function to the operator by using an information presenting device such as a display.

With this exemplary embodiment, the push-in position, i.e., the input area, is specified by using the output of the components of the two directions configured with the pushing-in data and the slide data. Next, the grounds for enabling specification of the input area with this method will be described.

FIG. 5 is a schematic illustration which shows the forefinger that is one of the fingers to be pushed in by dividing it at each joint. Note that a finger is sectioned into three regions from the finger tip to the first joint, from the first joint to the second joint, and from the second joint to the third joint, and each of the regions is considered as the input area. Each of the areas is called a first input area $1_1$, a second input area $1_2$, and a third input area $1_3$. Further, the finger can be virtually considered as a beam whose both ends are supported by a rotary support whose rotation angle is limited, since the rigidity of the finger is secured by the bones and the neighboring bones are connected by the joints. The lengths of the beams of each of the input areas $1_1$, $1_2$, and $1_3$ are defined as $l_1$, $l_2$, and $l_3$.

FIG. 6 is a schematic chart showing balances of the forces when each of the input areas $1_1$-$1_3$ is pushed in. The relevancy regarding the components of the two directions of the forces detected by the detecting unit 2 and each of the input areas 11-13 will be described by referring to FIG. 6.

In i) section of FIG. 6, shown is a state where the first input area $1_1$ is being pushed in. When the first input area $1_1$ is pushed in, the first joint cannot be bent further than that at an angle formed by connecting the first input area $1_1$ and the second input area $1_2$ by a straight line due to the moment of the force. Thus, relational formulae regarding the force applied for pushing in, the force at the third joint that is the base of the finger, and the push-in force to the vertical direction and the force sliding in the horizontal direction as components of the force applied to the detecting unit 2 can be found from six conditional expressions, i.e., a restraint condition of the length in the horizontal direction, a restraint condition of the length in the vertical direction, a balancing condition of the force in the horizontal direction, a balancing condition of the force in the vertical direction, a balancing condition of the moment around the base of the finger, and a balancing condition of the moment around the fingertip. The length in the horizontal direction from the fingertip to the base of the finger is defined as w and the height thereof is defied as h. The angle in the axis of the first area $1_1$ at the fingertip from the horizontal direction is defined as $\theta_1$, and the angle in the axis of the third area $1_3$ in the base of the finger from the vertical direction is defined as $\theta_3$. The force applied for pushing in works in the vertical direction, and the force thereof is defined as F. Further, the position to be pushed in is defined to be in the intermediate point of the beam in each of the input areas $1_1$-$1_3$. The force in the horizontal direction out of the forces applied to the fingertip is defined as $F_{1x}$, and the force in the vertical direction is defined as $F_{1y}$. The force in the horizontal direction applied to the base of the finger is defied as $F_{3x}$, and the force in the vertical direction is defined as $F_{3y}$.

Restraint condition of length in horizontal direction:

$$w = l_3 \sin\theta_3 + (l_1 + l_2) \cos\theta_1$$

Restraint condition of length in vertical direction:

$$h = l_3 \cos\theta_3 + (l_1 + l_2) \sin\theta_1$$

Balancing condition of the force in horizontal direction:

$$F_{1y} + F_{3y} = F$$

Balancing condition of the force in vertical direction:

$$F_{3x} = F_{1x}$$

Balancing condition of the moment around the base of the finger:

$$\frac{1}{2} l_1 F \cos\theta_1 = w F_{3y} + h F_{3x} \qquad [\text{Expression 1}]$$

Balancing condition of the moment around the fingertip:

$$\left[ l_3 \sin\theta_3 + \left( \frac{1}{2} l_1 + l_2 \right) \cos\theta_1 \right] F = w F_{1y} - h F_{1x} \qquad [\text{Expression 2}]$$

The force in the horizontal direction $F_{1x}$ and the force in the vertical direction $F_{1y}$ applied to the fingertip can be calculated by substituting appropriate values to $l_1$, $l_2$, $l_3$, $\theta_1$, $\theta_3$ of the balancing conditional expressions.

Similarly, in a case where push-in action is conducted in the second input area $1_2$, the force in the horizontal direction $F_{1x}$ and the force in the vertical direction $F_{1y}$ applied to the fingertip can be calculated from the balancing conditional expressions shown in ii) of FIG. 6. In the case shown in the chart, when push-in action is conducted in the second input area $1_2$ even though the finger is not bent at the first joint but bent at the second joint, it depends on the position at which the force is applied and the angle. As in a case where push-in action is conducted in the third input area $1_3$, there may also be cases where the second joint is kept at an angle formed by connecting the second input area $1_2$ and the third input area $1_3$.

In a case where push-in action is conducted in the third input area $1_3$, the second joint cannot be bent further than that at an angle formed by connecting the second input area $1_2$ and the third input area $1_3$ by a straight line due to the moment of the force as shown in iii) of FIG. 6 which shows the state where the third input area $1_3$ is pushed in. Thus, the balancing expressions shown in the same section of FIG. 6 can apply, so that calculations can be done as in the cases where the pushing actions are conducted in the first and second input areas $1_1$ and $1_2$.

Further, in a case where the joint is kept to be straight by putting the force into the finger, the entire finger can be assumed as a single rigid body. Thus, calculations can also be done based on the balance in the force as well.

As described above, the force in the horizontal direction $F_{1x}$ and the force in the vertical direction $F_{1y}$ can be calculated by substituting appropriate values to $1_1$, $1_2$, $1_3$, $\theta_1$, $\theta_3$ of the balancing conditional expressions. Assuming that $F_{1x}$ and $F_{1y}$ when push-in actions are done in the first, second, and third input areas are expressed as $F_{1x}(1)$, $F_{1y}(1)$; $F_{1x}(2)$, $F_{1y}(2)$; $F_{1x}(3)$, $F_{1y}(3)$, following expressions apply as shown in FIG. 6.

$$F_{1x}(1) < F_{1x}(2) < F_{1x}(3)$$

$$F_{1y}(1) > F_{1y}(2) > F_{1y}(3)$$

Therefore, the following applies.

$$F_{1x}(1)/F_{1y}(1) < F_{1x}(2)/F_{1y}(2) < F_{1x}(3)/F_{1y}(3)$$

Based on this, it can be found that the input area where the push-in action is done can be specified from the ratio of the push-in data ($F_{1y}$) and the slide data ($F_{1x}$) of the detection data a.

Thus, in this exemplary embodiment, the input area where the push-in action is done is specified by comparing $F_{1x}/F_{1y}$ with the accumulated data b of the database 4 in step S102 by using $F_{1x}$ and $F_{1y}$ detected in step S101. Next, this specification of the input area will be described in more details.

FIG. 7 shows graphs illustrating relations between the frequency and the ratio ($F_{1x}/F_{1y}$) of the force in the slide direction with respect to the force in the push-in direction when each of the input areas $1_1$-$1_3$ is pushed in. Referring to FIG. 7, data variations can be observed due to such condition that the push-in directions and push-in positions are not fixed, etc. When the first input area $1_1$ shown in i) of FIG. 7 is pushed in, the force in the push-in direction ($F_{1y}$) appears notably. Thus, the ratio of the two component forces is distributed in the vicinity of small values. Further, when the third input area $1_3$ shown in iii) of FIG. 7 is pushed in, the force in the slide direction ($F_{1x}$) appears notably. Thus, the ratio of the two component forces is distributed in the vicinity of large values. Furthermore, when the second input area $1_2$ shown in ii) of FIG. 7 is pushed in, the force in the push-in direction and the force in the slide direction are balanced. Thus, it can be seen that the ratio of the two component forces is in the vicinity of "1".

There are large individual differences in the distributions in FIG. 7 not only due to data variations generated due to the push-in directions, push-in positions, and direction, but also when the finger to be pushed in is kept straight with a force so as not to be bent and due to personal habits at the time of pushing in the finger. Thus, considering the variations in the detection data a, it is necessary to conduct a plurality of tests and save the results thereof to the accumulated data b of the database 4 in advance.

FIG. 8 is a graph in which the graphs of i)-iii) shown in FIG. 7 are integrated. The value of the ratio ($F_{1x}/F_{1y}$) of the force in the slide direction with respect to the force in the push-in direction where the frequency of the second input area exceeds the frequency of the first input area is defined as a and the value of $F_{1x}/F_{1y}$ where the frequency of the third input area exceeds the frequency of the second input area is defined as β, and those values are kept in the database 4 as the threshold values. The threshold values (α, β) are sent to the input information specifying module 5 as the accumulated data b, and the input information specifying module 5 compares $F_{1x}/F_{1y}$ calculated from the detection data a with α, β to specify the input area. That is, it is judged that a push-in action is conducted in the first input area when $F_{1x}/F_{1y} < \alpha$, judged that a push-in action is conducted in the second input area when $\alpha < F_{1x}/F_{1y} < \beta$, and judged that a push-in action is conducted in the third input area when $\beta < F_{1x}/F_{1y}$ (step S102). Then, this specified information is outputted to the information presenting module 6 as the input information specified data c.

In order to prevent misjudgments when specifying the input area, it is desirable to provide insensible zones of a specific width by sandwiching α, β as shown in FIG. 9 so as not to judge any of the areas with $F_{1x}/F_{1y}$ in that zone. It is considered that the variations in the frequency of the ratio in the two component forces may become a normal distribution, when those are inputted by the same operator in the same manner. Thus, a method using a standard deviation to be described later may be employed for setting the threshold values including the insensible zones. For example, values corresponding to the maximum value of $F_{1x}/F_{1y} \pm 2.5\sigma$ may be set as the lower and upper threshold values respectively. It is necessary to keep in mind that "upper threshold value—lower threshold value" does not overlap with that of the other input areas.

FIG. 10 is a chart showing the corresponding relation regarding the lower and upper threshold values and the input information specified data c in the accumulated data b of the database 4. As shown in FIG. 10, in a case where only the threshold values are saved as the accumulated data b of the database 4, the detection data a of a plurality of pieces obtained at the time of pushing in each of the input areas $1_1$-$1_3$ are statistically processed when creating the database 4, the lower and upper threshold values are set, and those are expressed in the corresponding relation with respect to the input areas $1_1$, $1_2$, and $1_3$ as the accumulated data b.

Further, while only the threshold values are taken as the accumulated data b of the database 4 herein, the threshold values may be included as a part of the judgment flow of the input information specifying module 5.

Furthermore, it is described that the force in the slide direction of the detecting unit 2 is generated by friction. Thus, the fingertip may be fixed or adhered by an adhesive substance to easily generate the force in the slide direction.

Next, a method for determining the threshold values of the accumulated data c in the database 4 will be described by referring to an actual example based on the standard deviation. FIG. 11 is a sectional view showing the detecting unit 2 used for creating this actual example. This detecting unit is for detecting the force of the components of two directions, i.e. the push-in direction and the slide direction, and it includes a key top $2_1$ to which the fingertip makes contact, a parallel plate $2_3$ placed underneath the key top $2_1$ for dispersing the force of the key top $2_1$, and two pressure-sensitive sensors $2_4$ each detecting the power applied to the parallel plate $2_3$. In FIG. 11, "7" is a wiring board, "8" is a casing, and "9" is a base. With this detector, the force of the components in two directions was obtained by taking the mean values of the two pressure-sensitive sensors $2_4$ as the force in the push-in direction and the difference thereof as the force in the slide direction.

FIG. 12 is a chart showing the relation between the frequency and the ratio regarding the force in the slide direction with respect to the force in the push-in direction when each input area is pushed in.

It is a chart showing a frequency distribution graph obtained by conducting push-in actions one hundred times each in each of the input areas $1_1$-$1_3$, calculating the ratios of the force in the slide direction with respect to the force in the push-in direction in the detecting unit 2 detected in the push-in actions, and by taking each variable quantity within a range of 0.1 interval as the lateral axis and the frequency number within each range as the longitudinal axis. Further, variation in each of the input areas is considered to become the normal distribution, so that the graph of the normal distribution can be expressed as follows with the mean value μ and the standard deviation σ.

$$f(x) = \frac{1}{\sqrt{2\pi}\,\sigma}\exp\left\{\frac{-(x-\mu)^2}{2\sigma^2}\right\}$$ [Expression 3]

Thus, the normal distribution graph of each input area turns out as in a form from the first input area—normal distribution to the third input area—normal distribution. From this graph, it can be also considered that there is no problem even if the variation is taken as the normal distribution.

FIG. 13 is a chart showing the corresponding relation regarding the lower and upper threshold values and the input areas. It is a chart showing the lower and the upper threshold values of the accumulated data c in the database 4 by calculating the mean value μ and the standard deviation σ from the ratio of the push-in direction and the slide direction and the frequency thereof shown in FIG. 12. The lower-limit values and the upper-limit values are calculated based on the reliable range μ± σ where the reliability is 68.26%. There is no overlapping in the upper-limit value in the first input area $1_1$ and the lower-limit value in the second input area $1_2$ as well as the lower-limit value in the second input area $1_2$ and the upper-limit value in the third input area $1_3$, so that those values are simply taken as the lower-limit values and the upper-limit values.

Similarly, referring to FIG. 14 which is a chart showing the corresponding relation between the lower and upper threshold values and the input areas, the lower-limit values and the upper-limit values are calculated based on the reliable range μ± 2σ where the liability is 95.44%. In this case, the upper-limit values and the lower-limit values of the neighboring input areas overlap with each other. Thus, the mean values regarding the upper-limit value in the first input area $1_1$ and the lower-limit value in the second input area $1_2$ as well as the lower-limit value in the second input area $1_2$ and the upper-limit value in the third input area $1_3$ are obtained, and the values are used as the threshold values for dividing each of the input areas $1_1$, $1_2$, and $1_3$.

FIG. 15 is an accuracy chart for each of the input areas. The relation between the system and the percentage of the correct answer was obtained by using the threshold values calculated in FIG. 13 and FIG. 14. As an experiment, instructions of input to each of the input areas $1_1$, $1_2$, and $1_3$ were provided on the information presenting module 6 which displays data showing prescribed symbols, characters, functions, and the like related to the input positions, and the accuracy relation with respect to the input area assumed as the designated input area was calculated when the input operation was conducted under that condition. It is the accuracy chart shown by using the threshold values determined based on the reliable range μ± 2σ and the threshold values determined based on the reliable range μ± 2σ through conducting the operations about one hundred times for each input area shown randomly. With the output for the input in the reliable range μ± σ, there are many cases of being un-judged even if there is an action.

As shown in FIG. 15, the reliability ranges of the neighboring input areas $1_2$ and $1_3$ overlap with the second input area $1_2$, so that the range judged as the second input area $1_2$ becomes small. Therefore, there is a tendency of having low percentage of correct answer compared to the other input areas. This can be improved by setting the threshold values by giving priority to the second input area 12 when determining the threshold values in a case where the input areas overlap with each other.

While the case of the forefinger has been described above, input of at least ten columns of the Japanese syllabary required for inputting characters can be done by having the middle finger and the third finger operate the same actions and also by adding the operation of the thumb. Even though not used in FIG. 2, it is also possible to secure the areas corresponding to symbols of "#", "*", a "Clear" key, and an "Enter" key by using the little finger or dividing the area of the thumb.

Further, while the Japanese kana characters of "a"-"wa" are used as the prescribed symbols and characters allotted to the input positions with the information presenting module 5 of the exemplary embodiment, the English letters such as "A"-"Z" or numerals "0"-"9" may also be used.

Furthermore, while the force in the push-in direction and the force in the slide direction are transmitted with the detection data a, and the accumulated data b of the database 4 carries the ratio thereof in the exemplary embodiment, the detection data a may carry the force of components in the two directions. Moreover, the accumulated data b may directly carry each of the values of the components in the two directions.

Further, while the detecting unit 2 of the exemplary embodiment uses the force sensor which detects the two components of the push-in direction and the slide direction, it is also possible to specify the input area based on tilt angle by detecting the tilt of the contact face by arranging a plurality of sensors under the key top.

Further, while the detecting unit 2 of the exemplary embodiment uses the force sensor which detects the two components of the push-in direction and the slide direction, it is also possible to specify the input area based on deviation in the distribution by detecting the distribution of the pressure applied on the pushed surface.

Furthermore, while the input area 1 is specified by using the two components in the exemplary embodiment, it is also possible to use data of three or more components.

Moreover, while the input area 1 in the exemplary embodiment is assumed as the left hand or the back of a finger, it is not limited only to the hand or the finger but may be adapted to each part of a body. For example, a person may stand on the apparatus, and the detecting unit 2 may acquire changes in the force on the sole of the foot to specify input actions to the knee and thigh.

Further, while the input area 1 in the exemplary embodiment is assumed as the left hand or the back of a finger, it is also possible to be adapted to a case where there is disability in the body and the person requires an artificial limb. For example, the detecting unit 2 may acquire changes in the force generated in an artificial hand or at a fingertip of an artificial finger to specify the push-in positions and input actions.

Second Exemplary Embodiment

FIG. 16 is a block diagram showing the structure of a second exemplary embodiment of the invention. As shown in FIG. 16, with the second exemplary embodiment, the detecting unit 2 which detects the force applied at the time of push-in action detects the force in the push-in direction and outputs data thereof as detection data d. Then, the input information specifying module 5 receives the detection data d, and compares it with accumulated data e of the database 4 which saves the corresponding relation between the force of one component and the push-in position to specify the input area 1. Then, the input information specifying module 5 outputs the information to the information presenting module 6 as the input information specified data c.

The detecting unit 2 which detects the push-in force does not pay attention to the slide direction herein but detects only the force of a component of one direction, i.e., the push-in direction, since it is considered that the friction between the detecting unit 2 and the finger largely affects the force of the slide direction that is in parallel to the contact face at the time of conducting the push-in action.

Next, actions of the exemplary embodiment will be described. As shown in FIG. 6 and as described in the first exemplary embodiment, the pushing force F and the force Fly in the push-in direction in the detecting unit 2 depend on the push-in position. FIG. 17 shows the relation between the force $F_{1y}$ in the push-in direction in the detecting unit 2 and the frequency thereof when each of the input areas $1_1$-$1_3$ is pushed in. When the first input area $1_1$ is pushed in, the force is applied in the push-in direction at a position close to the detecting unit 2 as shown in i) of FIG. 6. Thus, the force of the push-in direction when pushing in the first input area in FIG. 17 is mostly distributed in a range of large values. When the third input area $1_3$ shown in FIG. 17 is pushed in, the force is applied at a position distant from the detecting unit 2 as shown in iii) of FIG. 6. Thus, the pushing force F is transformed greatly to the force of the slide direction in the detecting unit 2, so that the force $F_{1y}$ in the push-in direction is mostly distributed in a small range. Similarly, when the second input area $1_2$ shown in FIG. 17 is pushed in, the force in the push-in direction in the detecting unit 2 is distributed in the middle of the first input area and the third input area. From this, it can be found that there is relevancy between the force in the push-in direction in the detecting unit 2 and the push-in position, in a case where the pushing force F is constant.

In the input device of the exemplary embodiment, the push-in target used for input is a finger of a person. Thus, there is a limit in the force generated by the push-in action, so that variation thereof is small. Therefore, the input position can be fully specified based on the force in the push-in direction.

Next, actions of the input information specifying module 5 will be described. The accumulated data e saved in the database 4 in advance is γ and δ which are obtained from data expressing the relevancy between the force in the push-in direction and the frequency thereof shown in FIG. 17. That is, saved is the data which shows that push-in action is conducted in the third input area $1_3$ in a case where the force $F_{1y}$ in the push-in direction is smaller than γ ($F_{1y}$<γ), shows that push-in action is conducted in the second input area $1_2$ in a case where γ<$F_{1y}$<δ, and shows that push-in action is conducted in the first input area $1_1$ in a case where $F_{1y}$>δ.

Incidentally, when specifying the input areas $1_1$-$1_3$ as the input positions from the accumulated data, there is a possibility of having an error in the input area that is specified at last depending on at what timing of the process of the push-in action the detecting unit 2 conducts detection, since the input areas other than the input area to be specified contain a great amount of forces in the same push-in direction. Thus, it is necessary to have a step for selecting the detection data d that is required for specifying the input area in the detection data d from the detecting unit 2. Hereinafter, the actions of the second exemplary embodiment will be described by referring to FIG. 18 that is a flowchart containing an input information specifying action.

First, detection of the force in the push-in direction is executed by the detecting unit 2 in step S201, and the detection data d is transmitted to the input information specifying module 5. When the input information specifying module 5 receives the detection data d in step S202, the detection data d showing the largest force in the push-in direction during the process from the start of the push-in action to the end thereof is selected as the data in a process of one push-in action as can be seen from FIG. 19 which shows chronological changes in the force in the push-in direction.

In next step S203, specification of the input area is conducted by comparing the data d selected in step S202 with the accumulated data e from the database 4. Then, the information presenting module 6 displays the information allotted to the specified input area in step S204.

In the above, it is described that the input information specifying module executes the processing for selecting the largest force in the push-in direction during the process from the start of the push-in action to the end thereof as the detection data d in step S203. However, a following means may be employed instead. FIG. 20 is a graph showing the chronological changes of the forces in the push-in direction when each of the input areas $1_1$, $1_2$, and $1_3$ is pushed in. The forces in the push-in direction in FIG. 20 are differentiated with respect to time, and the force in the push-in direction after the differential value takes the maximum value is treated as the data in step S203. In a case where rise judgment is done based on the time derivatives, it is likely to be influenced by noises of the input. This, it is necessary to eliminate the noises of the detection data d by a low-pass filter or the like.

Further, as shown in FIG. 20, the time difference until $F_{1y}$ rises is the time in which the finger is pushed in and the force is transmitted, so that $F_{1y}$ rises in order of the first input area $1_1$, the second input area $1_2$, and the third input area $1_3$. The input area may also be specified from the time difference until $F_{1y}$ rises. Also, the time derivative values of the force $F_{1y}$ in the push-in direction take the maximum value in the first input area $1_1$, and the values thereof become smaller towards the second input area $1_2$, and to the third input area $1_3$. Thus, the input area may be specified from the difference of the time derivative values.

Third Exemplary Embodiment

A third exemplary embodiment shown in FIG. 21 is a case which uses: as the detecting unit 2, a unit that is structured to specify a region of the living body to which the physical quantity is applied and an action of applying the physical quantity to the living body, and to output the action in the region based on the physical quantity as analog-quantity detection data; and as the input information specifying module 5, a module that is structured to collate the detection data with the data accumulated in the database 4, and to output the data allotted to the action in the region corresponding to the physical quantity as the input information of the electronic data based on the collation result.

Next, the third exemplary embodiment will be described. In the third exemplary embodiment shown in FIG. 21, a tracing action (slide action) when tracing the input area (sliding another finger on the top-face side of a finger) set in the top-face side of a finger (back of the finger) and data such as symbols or characters allotted to the tracing action is displayed, or pointer action or scroll action is conducted on a screen.

As shown in FIG. 21, with the exemplary embodiment, the detecting unit 2 which detects the force at the time of push-in action (when tracing the input area) detects three components, i.e., the pushing force at the time of push-in action and the two horizontal-direction components that are the force sliding in the fingertip direction and the force sliding in the vertical direction of the finger side face, and outputs detection data f configured with push-in data and slide data. Upon receiving the detection data f, the input information specifying module 5 specifies a change in the push-in position by comparing the combination of the detection data f with accumulated data g of the database 4 set in advance, specifies the input action (tracing action), and outputs the input information specified data h. Then, the information presenting module 6 presents a display based on the input information specified data h.

Next, actions of the input device according to this exemplary embodiment will be described. With this exemplary embodiment, the detection data f of three-direction components changing chronologically is acquired by using the detecting unit shown in FIG. 3, for example, and the input action that is a tracing action is specified by using it. FIG. 22 is a flowchart showing the actions of the input device according to the exemplary embodiment. When tracing of the finger whose fingertip is in contact with the apparatus, a force sensor 22 of the detecting unit 2 detects the pushing force at the time of push-in action and the two components that are the force sliding in the fingertip direction along the horizontal direction and the force sliding in the vertical direction of the finger side face, takes each of the three-direction components as push-in data, the fingertip slide data, and the finger side face vertical slide data, takes those three-direction components as the detection data f, and outputs the detection data which continuously changes in accordance with the tracing action (step S301 in FIG. 22).

When the finger tracing action is started, the input information specifying module 5 specifies at which position of the input area the tracing action is started by referring to the detection data of immediately after the start and the accumulated data g saved in the database 4 in advance. Thereafter, fetching of the detection data f is conducted at a prescribed time interval, and the tracing position at each time is specified by referring to the accumulated data g (step S302 in FIG. 22). When the position information in time series is acquired in step S302, the input information specifying module 5 subsequently specifies the tracing action by referring to the position data in time series saved as the accumulated data g in the database 4 in advance, outputs the tracing action information to the information presenting module 6 as the input information specified data h (step S303 in FIG. 22). At last, a display allotted to the specified input action is presented in step S304. For example, pointer position and action on the information presenting device are displayed.

Next, tracing actions will be described by referring to a case of a forefinger of a left hand. FIG. 23 is a schematic illustration showing the left forefinger, which is an illustration showing the same part as that of the schematic illustration shown in FIG. 5. However, in FIG. 23, each input area is divided into two regions. For example, the second input area $1_2$ is divided into a second input area radius side $1_{21}$ that is on the right side of the center line of the finger and a second input area ulna side $1_{22}$ on the left side thereof. This is the same for the first input area $1_1$ and the third input area $1_3$. For example, when the center part (on the center line) of the second input area is pushed in, the slide force in the finger side face vertical direction is hardly detected. Note here that the finger side face vertical direction is a direction orthogonal to the fingertip direction (x-direction in FIG. 6) and the vertical direction (y-direction in FIG. 6). In the meantime, a force is generated to the left side (ulna side) of the finger face side vertical direction when the second input area radius side $1_{21}$ is pushed in, and a force is generated to the right side (radius side) of the finger face side vertical direction when the second input area ulna side $1_{22}$ is pushed in. Thus, it is possible to judge whether the second input area $1_2$ is traced from the radius side to the ulna side or from the ulna side to the radius side by checking the outputted detection data f. This is the same for the first input area $1_1$ and the third input area $1_3$.

Next, the reasons for enabling specification of the input area by using the input information specifying module 5 will be described more specifically. The detection data f inputted to the input information specifying module 5 contains three-direction force components. The forces detected by the detecting unit vary greatly depending on personal differences, and the friction coefficient between the fingertip and the key top is great. Thus, it is effective to calculate the ratio of the slide-direction force with respect to the force in the push-in direction and specify the input area by using the ratio for improving the accuracy. Regarding the directions of the force, the force in the push-in direction is defined as positive, the fingertip direction of the hand is defined as positive in the fingertip slide direction, and the direction from the ulna side of the hand towards the radius side is defined as positive in the finger side face vertical slide direction.

FIG. 24A and FIG. 24B are charts showing the relations between the frequency and the ratio of the force in the slide direction with respect to the force in the push-in direction when each of the input areas shown in FIG. 23 is pushed in. Referring to FIG. 24, data variations can be observed due to such condition that the push-in directions and push-in positions are not fixed, etc. As shown in FIG. 24A(i), the force in the push-in direction appears notably when the first input area radius side $1_{11}$ is pushed in. Thus, the ratio of the fingertip slide direction is distributed in the vicinity of small values, and the ratio of the finger side face vertical slide direction takes negative values. Inversely, as shown in FIG. 24B(iv), the ratio of the finger side face vertical slide direction takes positive values when the first input area ulna side $1_{12}$ is pushed in. Further, as shown in FIG. 24A(iii) and FIG. 24B (vi), the force in the fingertip slide direction appears notably when the third input area radius side $1_{31}$ or the third input area ulna side $1_{32}$ is pushed in. Thus, the ratio of the fingertip slide direction shows large values. Furthermore, when the second input area of FIG. 24A(ii) and FIG. 24B(v) is pushed in, the component forces of the push-in direction and slide direction are balanced, so that the values are distributed in the vicinity of "1".

As described above, with the exemplary embodiment, the input information specifying module 5 specifies the input area by comparing the detection values of immediately after the tracing action fetched from the detection data f from the detecting unit 2 and the detection values fetched at a prescribed time interval with the accumulated data g from the database 4. The method for comparing the detection value fetched from the detection data f with the accumulated data g is the same as that of the first exemplary embodiment. That is, as shown in FIG. 9 which shows the threshold values for specifying each of the input areas, the threshold values are set with the ratio of the two component forces from the distribution of the values, and which of the input areas is pushed-in is specified (which part of the input area is traced) by each constant value. Further, it is considered to be the same for the finger side face vertical slide direction. However, in this exemplary embodiment, the first input area 1 is divided into the two regions of the first input area radius side $1_{11}$ and the first input area ulna side $1_{12}$. Therefore, the accumulated data g is of higher precision than the accumulated data b of the first exemplary embodiment.

Further, as in the case of the first exemplary embodiment, the threshold values may be set based on the mean value of the ratios of the two component forces and the standard deviation. The accumulated data g in the database 4 in that case turns out as in FIG. 25 which is a chart showing the corresponding relation between the lower and upper threshold values and the input areas. As shown in FIG. 25, in a case where only the threshold values are saved as the accumulated data g of the database 4, the detection data f of a plurality of pieces obtained at the time of push-in actions in each of the input areas are statistically processed when creating the database 4, the lower and upper threshold values are set, and those are expressed in the corresponding relation with respect to the input areas to be the accumulated data g.

Next, a process of step S302 and step S303 (see FIG. 22) mentioned above will be described in more details by using a specific example by referring to FIG. 26. In the left section of FIG. 26, a forefinger of the left hand is illustrated, and the directions of tracing actions (slide actions) conducted as input actions to the finger are illustrated with arrows. In the middle section of FIG. 26, three directions that change according to the tracing actions are illustrated (detection data f). In the left section of FIG. 26, changes in the input areas specified in step S302 are illustrated.

FIG. 26(i) shows a case where the second input area $1_2$ is traced to the left direction (viewed from the person who conducts input), i.e., in a case where it is traced starting from the second input area radius side $1_{21}$ to the second input area ulna side $1_{22}$. FIG. 26(ii) shows a case where the second input area $1_2$ is traced to the right direction, i.e., in a case where it is traced starting from the second input area ulna side $1_{22}$ towards the second input area radius side $1_{21}$. Further, FIG. 26(iii) shows a case where the forefinger of the left hand is traced from the base of the finger towards the fingertip direction, i.e., in a case where it is traced from the third input area $1_3$ to the first input area $1_1$. FIG. 26(iv) shows a case where the forefinger of the left hand is traced from the fingertip towards the finger base direction, i.e., in a case where it is traced from the first input area $1_1$ to the third input area $1_3$.

In the case of FIG. 26(i), the force in the push-in direction is gradually deteriorated as the tracing action is advanced towards the second input area ulna side $1_{22}$. Further, the force in the fingertip slide direction is almost constant during the process of tracing action. In the meantime, the force in the finger side face vertical slide direction shows a positive value while the tracing action is done in the second input area radius side $1_{21}$ and shows a negative value while the tracing action is done in the second input area ulna side $1_{22}$. The input information specifying module 5 specifies the tracing position from the detection data f at a specific time interval. Note here that the specified input areas may become as follows, when the time interval is set as properly short. That is, the second input area radius side, the second input area radius side, the second input area radius side, the second input area ulna side, the second input area ulna side, the second input area ulna side. However, it is possible that the second input area $1_2$ is specified during a process of changing from the second input area radius side to the second input area ulna side. When it is assumed that processing of rewriting the earlier input area with the latter input area is to be executed in a case where the specified input areas are the same areas continuously, changes in the specified areas become as follows. That is, the second input area radius side→the second input area ulna side, or the second input area radius side→the second input area→the second input area ulna side (step S302). Subsequently, the input information specifying module 5 specifies the tracing action as "second input area left-direction tracing action" by referring to the correspondence between the changes in the input areas and tracing actions contained in the accumulated data g from the database 4 (both the change of "the second input area radius side→the second input area ulna side" and the change of "the second input area radius side→the second input area→the second input area ulna side" correspond to "second input area left-direction tracing action" according to the accumulated data g). Similarly, in the case of FIG. 26(ii), the tracing action is specified as "second input area right-direction tracing action".

In the case of FIG. 26(iii), when the tracing action is advanced from the third input area ulna side $1_{32}$ to the second input area ulna side $1_{22}$ and then to the first input area ulna side $1_{12}$, the force in the push-in direction increases step by step while the force in the fingertip slide direction decreases step by step. In the meantime, the force in the finger side face vertical slide direction is almost "0" during the tracing action. The input information specifying module 5 specifies the tracing position from the detection data f at a specific time interval. Note here that the specified input areas become as follows, when the time interval is set as properly short. That is, the third input area, the third input area, the third input area, the second input area, the second input area, the second input area, the first input area, the first input area, and the first input area. When it is assumed that processing of rewriting the earlier input area with the latter input area is to be executed in a case where the specified areas are the same areas continuously, changes in the specified areas become as follows. That is, the third input area→the second input area→the first input area (step S302). Subsequently, the input information specifying module 5 specifies the tracing action as "fingertip-direction tracing action" by referring to the correspondence between the changes in the input areas and tracing actions contained in the accumulated data g from the database 4. Similarly, in the case of FIG. 26(iv), the tracing action is specified as "finger-base direction tracing action".

In the above, it is described to execute processing of rewriting the earlier input area with the latter input area in a case where the specified input areas are continuously the same. Inversely, however, it is also possible to keep all the specified input areas and actively utilize the number of the continuous same input areas. For example, the number of the continuous same input areas may be counted, the number of the tracing actions may be taken as speed information, and the input action to be allotted may be changed according to the speed information. For example, when a change in the input areas per unit time is large, it may be judged that the pointer operation or the scroll action is executed at a high speed or in a large movement, and it may be outputted as the input information specified data h.

Further, while the case of the forefinger has been described in the exemplary embodiment, the amount of information that can be acquired may be increased by increasing the input areas through adapting it to the other fingers at the same time. Furthermore, while the exemplary embodiment has been described by referring to the cases of the right-direction tracing action, the left-direction tracing action, the fingertip-direction tracing action, and the finger-base direction tracing action as the typical actions thereof, the tracing actions are not limited only to those. For example, the tracing action may be an oblique-direction tracing action or a tracing action over a plurality of fingers. Then, a pointer operation or a scroll action may be allotted to the tracing actions or a tap action not changing from the push-in position may be allotted to the tracing actions. Furthermore, while the detecting unit 2 in the exemplary embodiment uses the force sensor which detects three components of the push-in direction, the fingertip-direction slide direction, and the finger side face vertical slide direction, a method which places a plurality of strain sensors and detects distributions on the contact face may also be employed as long as it is possible to classify the force at least in three directions. Further, the exemplary embodiment may be utilized for handwritten character input. When conducting handwritten character input, it is necessary to place on the apparatus a contact sensor of the surface for detecting the tracing action. Thus, it is difficult to reduce the region for conducting the input operation. Meanwhile, the detecting unit 2 on the apparatus in this exemplary embodiment is small and the input area 1 can be secured large, which is effective.

Fourth Exemplary Embodiment

FIG. 27 is a block diagram showing the structure of a fourth exemplary embodiment of the input device according to the present invention. As shown in FIG. 27, the input device of the exemplary embodiment is configured with: an input unit 3 including a plurality of detecting units 2 provided at positions to be in contact with fingertips that conduct input, which detect a pressure distribution condition generated on the contact face between the pushing force and the fingertip when being pushed in and output the pressure distribution data as detection data i; an input information specifying module 5 which compares a calculation result calculated from the detection data i with accumulated data j in the database 4 set in advance to specify the push-in position upon receiving the detection data j, and outputs that position as the input information specified data c; and an information presenting module 6 which displays prescribed symbols, data, and functions allotted to the position upon receiving the information specified data c.

FIG. 28 is a plan view taken from the surface of an information terminal 10 where the detecting unit 2 is placed. As shown in FIG. 28, the detecting unit 2 is formed by disposing pressure-sensitive sensors $2_4$ arranged in line under the part to be in contact with the fingertip obliquely with respect to a side of a casing of the information terminal 10. Further, a slit 11 is provided between each of the pressure-sensitive sensors so that each of the pressure-sensitive sensors $2_4$ can easily detect the force separately when a push-in action is conducted. As shown in the right side of FIG. 28, each of the pressure-sensitive sensors $2_4$ is disposed on individual wiring boards 7.

FIG. 29 is a sectional view showing a detailed structure of the detecting unit 2. As shown in FIG. 29, the detecting unit 2 includes: a key top $2_1$ to which the fingertip of an operator makes contact; a pusher $2_5$ placed underneath the key top $2_1$, and a pressure-sensitive sensor $2_4$ placed underneath the pusher $2_5$ for detecting the distribution state, which are placed on the wiring board 7. Further, the slits 11 are provided between the key tops $2_1$, between the pushers $2_5$, between the pressure-sensitive sensors $2_4$, and between the wiring boards 7 so as to be able to detect the force in the fingertip direction at the contact face separately. In FIG. 29, "8" is the casing, "9" is a base, and "12" is a column for supporting each component.

Next, actions of the input device according to the exemplary embodiment will be described by referring to a flowchart shown in FIG. 30. With the exemplary embodiment, the input area is specified by using detection data i that is a load distribution detected by the pressure-sensitive sensors $2_4$ arranged in line in the fingertip direction. When a push-in action is conducted in the input unit 3, forces $S_1$, $S_2$, $S_3$, $S_4$, and $S_5$ are detected by the pressure-sensitive sensors 24 arranged in line in the fingertip direction in step S401. Upon receiving the detection values as the detection data i, the input information specifying module 5 calculates $R_G$ that is a load gravity center position in step S402, and calculates total load F in step S403. FIG. 31 is an explanatory diagram of the load gravity center position and the total load. As shown in FIG. 31, the load outputted from each pressure-sensitive sensor 24 is shown in a column graph in the drawing. The load center gravity position $R_G$ can be calculated as follows.

$$R_G = \frac{0.2S_1 + 0.4S_2 + 0.6S_3 + 0.8S_4 + S}{S_1 + S_2 + S_3 + S_4 + S_5} \quad \text{[Expression 4]}$$

When the gravity center position is at the base of the finger, it is calculated as the value in the vicinity of "0" and calculated as a value normalized as "1" when it is at the edge of the fingertip. Further, the total load F can be calculated as follows.

$$F = S1 + S2 + S3 + S4 + S5$$

Then, it is checked whether or not the total load exceeds a specific value in step S404. When judged that the load does not exceed the value, the procedure is returned to step S401. When judged that the load exceeds the value, the procedure is advanced to step S405 which is an input area specifying step. The load gravity center position RG at a stage where loading is small is unstable. Thus, step S404 is provided, and only the stable detection data i is utilized for the input area specifying step. The processing in step S405 is almost the same as the processing of step S102 in the first exemplary embodiment. The difference with respect to step S102 is that the input position is specified on the basis of the load center gravity positions $R_G$ in this exemplary embodiment, while the input position is specified on the basis of the ratio of the force in the slide direction with respect to the force in the push-in direction in the first exemplary embodiment. Then, in step S406, the information presenting module 6 receives the input information specified data c specified by the input information specifying module 5, and presents the prescribed symbols, data, or functions allotted to each input position to the operator by using an information presenting device such as a display.

With the exemplary embodiment, the detecting unit in which five pressure-sensitive sensors $2_4$ are disposed is used for calculating the load gravity center position. However, the number of the pressure-sensitive sensors may simply need to be two or more with which the load gravity center position can be obtained. Further, while the load gravity center position which is calculated linearly and normalized by the pressure-sensitive sensors $2_4$ arranged evenly is used as the load gravity center position, it is not essential to dispose the pressure-sensitive sensors $2_4$ evenly as long as those are arranged in layout with which the load gravity center position can be obtained. Furthermore, regarding calculation of the load position, it is not limited to execute linear calculation and normalization. For example, when the third input area $1_3$ (see FIG. 5) is pushed in, there is a tendency that the absolute value of the force in the detecting unit 2 becomes small. Thus, the sensitivity may be improved further by increasing the number of the pressure-sensitive sensors $2_4$ placed in the part closer to the base of the finger.

Further, while there has been described to utilize the value after the total load F becomes the load of more than the reference in step S404 in order to use only the stable value of the load gravity center position RG, it is not limited to use the total load F for obtaining the stable load gravity center position RG. For example, it is also possible to utilize the value only when the area of the region of the contact face becomes a specific area or more. Further, the flow of FIG. 30 is not limited only to that order. For example, the process of step S402 may be executed after step S404.

Next, a system created based on the fourth exemplary embodiment and the result thereof will be described. With the created system, there was assumed a card-size information terminal (see FIG. 42), one of the input areas of the left thumb was pushed in by a right hand while the terminal was being held up by the left hand, and the load gravity center position towards the fingertip direction was measured by the detecting unit 2. Note here that the third input area $1_3$ was defined as an articulation between the base of the thumb and the first joint, the second input area $1_2$ as the first joint, and the first input area $1_1$ as the nail tip.

FIG. 32 is a graph showing the relation between the frequency and the normalized gravity center position towards the fingertip direction when each input area is pushed in. It is a chart showing a frequency distribution graph obtained by conducting push-in actions two hundred times each in each of the input areas $1_1$, $1_2$, $1_3$, by calculating the normalized gravity center position to the fingertip direction in the detecting unit 2 detected at that time, and by taking each variable quantity within a range of 0.005 interval as the lateral axis and the frequency number within each range as the longitudinal axis. Further, variation in each of the input areas is considered to become the normal distribution, so that the graph of the normal distribution can be expressed as follows with the mean value μ and the standard deviation σ.

$$f(x) = \frac{1}{\sqrt{2\pi}\,\sigma} \exp\left\{\frac{-(x-\mu)^2}{2\sigma^2}\right\} \quad \text{[Expression 5]}$$

The difference with respect to FIG. 12 of the first exemplary embodiment is that the values when each input area is pushed in are inverted and the gravity center position when the first input area $1_1$ is pushed in appears large while the gravity center position when the third input area $1_3$ is pushed in appears small, since the gravity center position to the fingertip direction from the base of the finger is taken as the basis in this exemplary embodiment while the ratio of the push-in force with respect to the slide force is taken as the basis in the first exemplary embodiment.

FIG. 33 is a chart showing the corresponding relation regarding the lower and upper threshold values and the input areas. It is a chart showing the lower and the upper threshold values of the accumulated data j in the database 4 by calculating the mean value μ and the standard deviation a from the normalized gravity center position to the fingertip direction and the frequency thereof shown in FIG. 32. The lower-limit values and the upper-limit values are calculated based on the reliable range μ± 2σ where the reliability is 95.44%. There is no overlapping in the upper-limit value in the first input area $1_1$ and the lower-limit value in the second input area $1_2$ as well as the lower-limit value in the second input area $1_2$ and the upper-limit value in the third input area $1_3$, so that those values are simply taken as the lower-limit values and the upper-limit values.

FIG. 34 is an accuracy chart for each of the input areas. The relation between the system and the percentage of the correct answer was obtained by using the threshold values calculated in FIG. 32 and FIG. 34. As an experiment, instructions of input to each of the input areas were provided on the information presenting module 6 (see "6" of FIG. 42) which displays prescribed symbols, data, and functions related to the input positions, and the accuracy relation with respect to the input area assumed as the designated input area was calculated when the input operation was conducted under that condition. It is the accuracy chart shown by using the threshold values determined based on the reliable range μ± 2σ through conducting the operations about one thousand times for each of the input areas $1_1$, $1_2$, and $1_3$ shown randomly. This is the accuracy chart corresponding to the result of the percentage of correct answers of FIG. 15, and fine results were obtained in all of the input areas $1_1$, $1_2$, and $1_3$.

Fifth Exemplary Embodiment

FIG. 35 is a block diagram showing the structure of a fifth exemplary embodiment of the input device according to the present invention. As shown in FIG. 35, the input device of the exemplary embodiment is configured with: an input unit 3 including a plurality of detecting units 2 provided at positions to be in contact with fingertips that conduct input, which detect a pressure distribution condition generated on the contact face between the pushing force and the fingertip when being pushed in and output the pressure distribution data as detection data k; an input information specifying module 5 which compares a calculation result calculated from the detection data k with accumulated data m in the database 4 set in advance to specify the push-in position upon receiving the detection data k, and outputs that position as the input information specified data c; and an information presenting module 6 which displays data such as prescribed symbols, characters, functions, and the like allotted to the position upon receiving the information specified data c.

FIG. 36 is a plan view taken from the surface of an information terminal 10 where the detecting unit 2 is placed. As shown in FIG. 36, the detecting unit 2 is formed by disposing pressure-sensitive sensors $2_4$ arranged in matrix in the part to be in contact with the surface of a finger. It is structured to be able to detect the pressure-sensitive distribution of the surface of the finger with the pressure-sensitive sensors $2_4$ arranged at multiple points.

Next, actions of the input device according to the exemplary embodiment will be described. With this exemplary embodiment, when a push-in action is conducted to the input area, the input area is specified by using the detection data k which shows the load surface distribution of the contact face in the terminal regarding the forces transmitted in the body.

FIG. 37 is a flowchart showing the actions of the input device according to the exemplary embodiment. In step S501, the pressure-sensitive sensors $2_4$ arranged in matrix detect the pressure surface distribution on the contact face of the fingertip, and output the data thereof as the detection data k. In step S502, the input information specifying module 5 upon receiving the detection data k cuts out the region where the detecting unit 2 and the fingertip are in contact, and extracts the rectangular region.

FIG. 38 is an explanatory diagram showing the pressure-sensitive distribution state in the detecting unit 2. The finger contact region of the detecting unit 2 becomes the pressure-sensitive region. As shown in FIG. 38, the pressure-sensitive region is cut out in a rectangular shape in step S502. Note here that the coordinates of the part corresponding to the vertexes for cut-out are defined as $P_1$, $P_2$, $P_3$, and $P_4$. The pressure-sensitive sensors $2_4$ for obtaining the pressure surface distribution of the detecting unit 2 are arranged in matrix as (1, 2, - - - i - - - I) in the x-direction and (1, 2, - - - j - - - J) in the y-direction. Further, the value of the detecting unit 2 at the coordinates (i, j) is defined as $F_{ij}$.

Then, $P_G$ that is the load gravity center position is calculated in step S503. $P_{Gx}$ that is the x-direction component of P and $P_{Gy}$ that is the y-direction component of P can be calculated as follows, respectively.

$$P_{Gp} = \frac{\sum_{i=1}^{I}\left[i \cdot \sum_{j=1}^{J} F_{ij}\right]}{I \cdot \sum_{i=1}^{i} \sum_{j=1}^{J} F_{ij}} \quad \text{[Expression 6]}$$

$$P_{Gy} = \frac{\sum_{j=1}^{J}\left[i \cdot \sum_{i=1}^{I} F_{ij}\right]}{I \cdot \sum_{i=1}^{I} \sum_{j=1}^{J} F_{ij}} \quad \text{[Expression 7]}$$

Then, the total load F is obtained in step S504.
The total load F can be calculated as follows.

$$F = \sum_{i=1}^{I} \sum_{j=1}^{J} F_{ij} \quad \text{[Expression 8]}$$

Then, it is checked whether or not the total load F exceeds a specific value in step S505. When judged that the load does not exceed the value, the procedure is returned to step S501. When judged that the load exceeds the value, the procedure is advanced to step S506. The load gravity center position $P_G$ at a stage where loading is small is unstable. Thus, step S505 is provided, and only the stable detection data k is utilized for the input area specifying step. In step S506, gravity center direction vector $V_G \rightarrow$ in the rectangular region is calculated. An initial point of the rectangular gravity center direction vector is defined as the vertex on the closer side of the base of the finger in the rectangular region, and it is $P_1$ in this case. Then, in step S507, a vector in the major-axis direction of the rectangular region calculated in step S502 is calculated. The detecting unit 2 and the finger are in surface-contact in an elliptical shape, so that the major-axis direction of the rectangular region is the fingertip direction and the minor-axis direction is the finger side face vertical direction. Thus, the fingertip direction can be extracted by calculating the major-axis direction of the rectangular region. The initial point is defined as $P_1$ as in the rectangular gravity center direction vector in S506, and the vector in the rectangular major-axis direction is defined as V→.

Then, gravity center position ratio R to the major axis direction (normalized absolute value of major-axis direction component of the gravity center direction vector $V_G \rightarrow$) is calculated in step S508. The gravity center position ratio to the major-axis direction is obtained by a product of a cosine of the angle between the rectangular major-axis direction vector and the rectangular gravity center direction vector, and it is calculated to be a normalized value of "0" when the gravity center position is at the base of the finger and calculated to be "1" when it is at the edge of the fingertip. The major-axis direction gravity center position ration R can be calculated as follows.

$$R = \frac{\vec{V} \cdot \vec{V}_G}{|\vec{V}|^2} \quad \text{[Expression 9]}$$

Then, input information is specified in step S509. The processing in step S509 is almost the same as the processing of step S102 in the first exemplary embodiment. The input position is specified on the basis of the gravity center position ratio towards the major-axis direction within the rectangular region in this exemplary embodiment, while the input position is specified on the basis of the ratio of the force in the slide direction with respect to the force in the push-in direction in the first exemplary embodiment. Then, in step S510, the information presenting module 6 receives the input information specified data c specified by the input information specifying module 5, and presents the prescribed symbols, data, or functions allotted to each input position to the operator by using an information presenting device such as a display.

With the exemplary embodiment, the pressure-sensitive sensors 24 arranged in matrix are used for detecting the pressure-surface distribution state. However, the pressure-sensitive sensors may not need to be arranged in matrix as long as the pressure-surface distribution state can be obtained therewith. Further, while sensors which detect the analog values are used for the pressure-sensitive sensors $2_4$, it is also possible to use sensors which detect digital values of only ON—OFF. In that case, the load gravity center position corresponds to the area gravity center position of the contact face region. Further, while the gravity center position ratio is used as the basis for identifying the input area, the basis is not limited only to the load gravity center position as long as the load position from the finger can be specified therewith. For example, a point that shows the maximum value in the pressure-sensitive sensor $2_4$ can be treated equally as the load gravity center position $P_G$ of the exemplary embodiment. Further, for determining the positions of $P_1$, $P_2$, $P_3$, $P_4$ as the points at each corner of the rectangular region from the pressure distribution, it is not necessary to execute recalculation every time each input is done. For example, the finger contact region may be cut out in advance when the pressure-sensitive sensor $2_4$ detects that the finger touches the terminal before input, and the value calculated from the rectangular region thereof may be used. Furthermore, while the major-axis direction vector and the minor-axis direction vector of the rectangular region are calculated from the pressure distribution, it is also possible to extract a region other than a rectangular shape as long as the fingertip direction and the finger side face vertical direction can be separately extracted therefrom. For example, an oval region may be extracted from the pressure-distribution state, and same calculation may be conducted by using the major-axis direction vector of that oval.

FIG. 39 is a block diagram showing the structure of a sixth exemplary embodiment of the input device according to the present invention. This exemplary embodiment specifies a change in the position to which the finger that touches the detecting unit applies pressure, and specifies input information based thereupon as in the case of the third exemplary embodiment. As shown in FIG. 39, the input device of the exemplary embodiment is configured with: an input unit 3 including a plurality of detecting units 2 provided at positions to be in contact with fingertips that conduct input, which detect a pressure-surface distribution condition generated on the contact face between the pushing force and the fingertip when being pushed in and outputs the pressure distribution data as detection data n; an input information specifying module 5 which compares the gravity center position ratio of the fingertip direction with respect to the finger side face vertical direction calculated from the detection data n with accumulated data o in the database 4 set in advance to specify the push-in position and "tracing" action upon receiving the detection data n, and outputs the "tracing action" as the input information specified data h; and an information presenting module 6 which displays prescribed symbols, data, and functions allotted to the position upon receiving the information specified data h.

Next, actions will be described. With this exemplary embodiment, when a push-in action is conducted to an input area, the gravity center position ratio towards the calculated fingertip direction and the finger side face vertical direction is calculated based on the detection data n which shows the load surface distribution of the contact face in the terminal regarding the forces transmitted in the body, and the input area is specified by using the ratio. FIG. 40 is a flowchart showing the actions of the input device according to the sixth exemplary embodiment. The actions from step S601 to step S606 of this exemplary embodiment are the same as the actions from step S501 to step S506 of the fifth exemplary embodiment shown in FIG. 37, so that detailed explanations thereof are omitted.

After calculating the rectangular gravity center direction vector $\vec{V}_G$→(see FIG. 38) in step S606, the major-axis direction and minor-axis direction vectors in the rectangular region are calculated in step S607. The initial point is defined as $P_1$ as in the calculation of the rectangular gravity center direction vector in S507, and the vector in the rectangular major-axis direction is defined as VL→while the rectangular minor-axis direction vector is defined as $V_S$→. Then, gravity center position ratio $R_L$ towards the major-axis direction (normalized absolute value of major-axis direction component of the gravity center direction vector $V_G$→) and gravity center position ratio RS towards the minor-axis direction (normalized absolute value of minor-axis direction component of the gravity center direction vector $V_G$→) are calculated in step S608. The gravity center position ratio $R_L$ towards the major-axis direction can be obtained in the same manner as the case of step S508. The gravity center position ratio $R_S$ towards the minor-axis direction can be obtained by a cosine of the angle between the rectangular minor-axis direction vector and the rectangular gravity center direction vector, and it is calculated to be a normalized value of "0" when the gravity center position is closer to $P_1$ that is the vertex of the rectangular closer to the base of the finger and to be "1" when it is farther. That is, those can be calculated as follows.

$$R_L = \frac{\vec{V}_L \cdot \vec{V}_G}{|\vec{V}_L|^2}$$ [Expression 10]

$$R_S = \frac{\vec{V}_S \cdot \vec{V}_G}{|\vec{V}_S|^2}$$ [Expression 11]

FIG. 41A and FIG. 41B are charts showing the relations between the gravity center position ratios towards the major-axis and minor-axis direction and frequencies thereof when each input area is pushed in. As shown in FIG. 41A and FIG. 41B, data variations can be observed due to such condition that the push-in directions and push-in positions are not fixed, etc.

As shown in i) of FIG. 41A, the fingertip is pushed when pushing in the first input area radius side $1_{11}$. Thus, the gravity center position ratio to the major-axis direction having the fingertip direction as positive shows a value close to "1" that is the maximum value. Meanwhile, in the finger side face vertical direction, the gravity center position ratio to the minor-axis direction shows a value close to "0", since the angle close to the base of the finger on the radius side of the rectangular region when viewing the contact face from the above is taken as the initial point of the rectangular gravity center direction vector, the rectangular major-axis direction vector, and the rectangular minor-axis direction vector. Inversely, as shown in iv) of FIG. 41B, the gravity center position ratio to the minor-axis direction takes a value close to "1", when the first input area ulna side $1_{12}$ is pushed in. Further, as shown in iii) of FIG. 41A and vi) of FIG. 41B, the part close to the base of the finger is pushed when pushing in the third input area $1_3$. Thus, the gravity center position ratio to the major-axis direction shows a value close to "0" that is the minimum value. Furthermore, as shown in ii) of FIG. 41A and v) of FIG. 41B, the major-axis direction gravity center position ratio is in the vicinity of the center when the second input area radius side $1_2$ is pushed in.

The major-axis direction gravity center position ratio $R_L$ and the minor-axis direction gravity center position ratio $R_S$ acquired in step S608 are stored. Subsequently, it is checked whether or not the tracing action is ended in step S609. When judged that it is not ended, the procedure is returned to step S601 and the flow of steps S601 to S608 is repeated further. This repetition is executed at every prescribed time interval, for example. Then, the major-axis direction gravity center position ratios and the minor-axis direction gravity center position ratios acquired at each time are stored. When judged in step S609 that the tracing action is ended, the procedure is advanced to step S610.

In step S610, the change in the input area is specified by referring to the accumulated data o of the database 4 from a plurality of sets of the major-axis direction gravity center position ratios and the minor-axis direction gravity center position ratios acquired in step S608. Further, in step S611, the tracing action is specified by referring to the accumulated data o of the database 4, and the tracing action information is outputted towards the information presenting module as the input information specified data h. Then, in step S612, the information presenting module 6 receives the input information specified data h specified by the input information specifying module 5, and presents the prescribed symbols, data, or functions allotted to each input position to the operator by using an information presenting device such as a display.

With the exemplary embodiment, the pressure-sensitive sensors 24 arranged in matrix are used for detecting the pressure-surface distribution state. However, the pressure-sensitive sensors may not need to be arranged in matrix as long as the pressure-surface distribution state can be obtained therewith.

Example 1

FIG. 42A is a perspective view showing a state where input is conducted to EXAMPLE 1 of the first exemplary embodiment according to the present invention. This EXAMPLE is a case where the present invention is applied to a thin-type card-size terminal. As shown in FIG. 42A, four detecting units 2 and an information presenting device 6a are provided to the information terminal 10. One of the detecting units 2 is touched by the thumb, and push-in action is conducted to the first to third input areas $1_1$-$1_3$ provided in the fore side of the first joint of the back side of the thumb and between the joints. In the EXAMPLE, contact to each detecting unit is done only with the thumb.

As shown in FIG. 42B, the detecting unit 2 on the uppermost side of the drawing is touched by the fingertip of the thumb and the first input area $1_1$ is pushed in, and input of "sa" column is executed as the input characters. Input of "ka" column is executed when the second input area $1_2$ is pushed in, and input of "a" column is executed when the third input area $1_3$ is pushed in. Further, when the fingertip of the thumb is touching the second highest detecting unit on the apparatus, the first input area $1_1$ corresponds to "ha" column, the second input area $1_2$ corresponds to "na" column, and the third input area $1_3$ corresponds to "ta" column. Thus, even within the same input area, the allotted data of prescribed symbols, characters, or functions and the like can be changed through changing the position of the detecting unit 2 that is in contact with the device.

With this EXAMPLE, input operations can be done while keeping the device in the hands.

Example 2

FIG. 43 is a perspective view showing a state where input is conducted to EXAMPLE 2 of the third exemplary embodiment according to the present invention. This EXAMPLE is a case where it is difficult to secure a large area for the detecting unit 2 for detecting input on s same place of a display unit due to a large-sized display. This EXAMPLE is a case where the exemplary embodiment of the present invention is applied to a full-screen terminal (EXAMPLES 3 and 4 are also the cases where the present invention is applied to a full-screen terminal). In this EXAMPLE, the detecting unit 2 is provided to the side of the apparatus, and tracing actions to each finger are conducted by holding the apparatus while covering it from the back side. In FIG. 43, the tracing actions are illustrated with arrows (same in FIG. 44 and FIG. 45). Specification of such tracing actions can be considered to be used as a page turning function of electronic books, etc. In that case, the detecting unit 2 may be provided at positions where fingertips of each of the fingers are in contact with the terminal. For example, the detecting unit 2 may be provided in the side where the thumb is in contact or the back face where the forefinger is in contact. Further, other than the detecting unit 2, a hollow or the like may be formed at a position where there is no detecting unit so that the postures of each of the fingers can be settled.

When the tracing actions to each finger change the functions depending on the fingers, it is difficult to check where the input is to be directed by watching the input state with a normal input method executed for the full-screen terminal, since the input area to be operated comes on the back-face side of the apparatus. However, in the case of this EXAMPLE, the target that is in contact for the operation is a part of the body, so that the position that is in contact can be known. That is, this EXAMPLE is effective as the device which can correspond to the state where it is not possible to visually check at which position the operation is to be done.

Example 3

FIG. 44 is a perspective view showing a state where input is conducted to EXAMPLE 3 of the third exemplary embodiment according to the invention. In this EXAMPLE, the detecting unit 2 can be provided to a display surface where the thumb is in contact or the apparatus side and the back face where the other fingers are in contact. With this EXAMPLE, it is possible to specify the action that is equivalent to the scroll operation in a web-connecting terminal depending on the way of holding the apparatus.

Example 4

FIG. 45 is a perspective view showing a state where input is conducted to EXAMPLE 4 of the third exemplary embodiment according to the present invention. Referring to FIG. 45, the actions equivalent to a mouse and key operations of crosswise directions can be specified by using the back of a hand that can be secured wide depending on the way of holding the apparatus. In that case, a state of forces at positions that are in contact with each finger on the back side of the terminal may be detected in addition to acquiring the force of the fingertip of the thumb by the detecting unit 2.

In EXAMPLES 2-4, the detecting unit 2 which detects input may not have to be touched by the tip of the finger. For example, scroll actions may be specified through identifying the tracing action to the surface of the back side of the finger by acquiring the pressure distribution state of the surface that is in contact with the information terminal by allowing a wide region of the finger to be in a contact with the detecting unit 2.

While the present invention has been described by referring to the embodiments (and examples), the present invention is not limited only to those embodiments (and examples) described above. Various kinds of modifications that occur to those skilled in the art can be applied to the structures and details of the present invention within the scope of the present invention.

INDUSTRIAL APPLICABILITY

With the embodiments of the present invention, electronic data input information can be outputted in addition to physical quantity of living bodies. For example, it is possible to provide a force device that is optimum for information devices such as mobile telephones, PDAs, and notebook PCs. Further, it is possible to provide an information device to which the input device is mounted.

BRIEF DESCRIPTION OF THE DRAWINGS

FIG. 6 is an explanatory chart showing balances of the forces when each input area is pushed in;

FIG. 7 shows graphs which illustrate the relations between the frequencies and ratios of the force in the slide direction with respect to the force in the push-in direction when each input area is pushed in;

FIG. 10 is an explanatory chart which shows the corresponding relation between lower threshold values as well as upper threshold values and input information specified data c;

FIG. 12 shows graphs which illustrate the relations between the frequencies and ratios of the force in the slide direction with respect to the force in the push-in direction when each input area is pushed in;

FIG. 13 is an explanatory chart which shows the corresponding relation between lower and upper threshold values and input areas;

FIG. 14 is an explanatory chart which shows the corresponding relation between lower and upper threshold values and input areas;

FIG. 15 is an accuracy chart for each input area;

FIG. 17 shows a graph which illustrates the relation between the frequency and the force in the push-in direction when each input area is pushed in;

FIG. 20 is a graph showing chronological changes of the push-in direction force when each input area is pushed in;

FIG. 24A shows graphs which illustrate the relations between the frequencies and ratios of the force in the slide direction with respect to the force in the push-in direction when each divided input area is pushed in;

FIG. 24B shows graphs which illustrate the relations between the frequencies and ratios of the force in the slide direction with respect to the force in the push-in direction when each divided input area is pushed in;

FIG. 25 is a chart which shows the corresponding relation between lower and upper threshold values and input areas;

FIG. 26 is a chart for describing a method for specifying tracing actions;

FIG. 32 shows a graph which illustrates the relation between the frequency and gravity center position ratio to the fingertip direction of the fourth exemplary embodiment when each divided input area is pushed in;

FIG. 33 is a chart which shows the corresponding relation between lower and upper threshold values and input areas according to the fourth exemplary embodiment;

FIG. 34 is an accuracy chart for each input area according to the fourth exemplary embodiment;

FIG. 41 A shows graphs which illustrate the relations between the frequencies and gravity center position ratios to the major-axis and minor-axis directions when each divided input area is pushed in;

FIG. 41B shows graphs which illustrate the relations between the frequencies and gravity center position ratios to the major-axis and minor-axis directions when each divided input area is pushed in;

REFERENCE NUMERALS

Figure 1A:
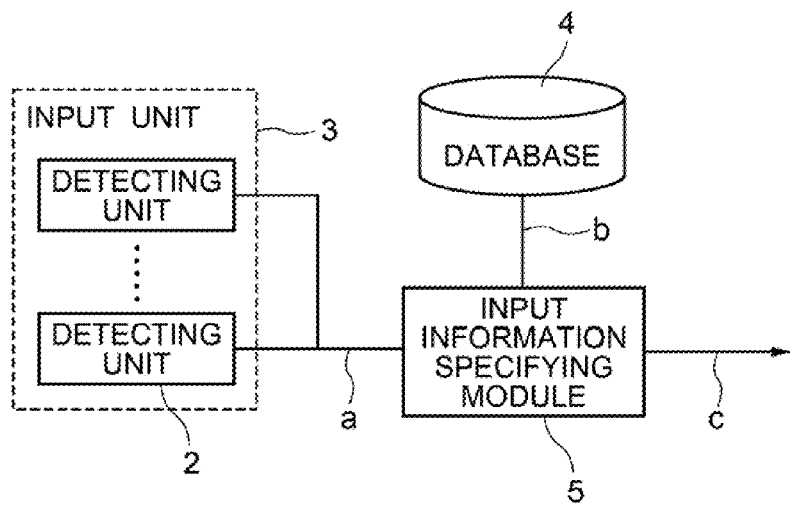
FIG. 1 is a block diagram showing the structure of a first exemplary embodiment of an input device according to the present invention.
Figure 1B:
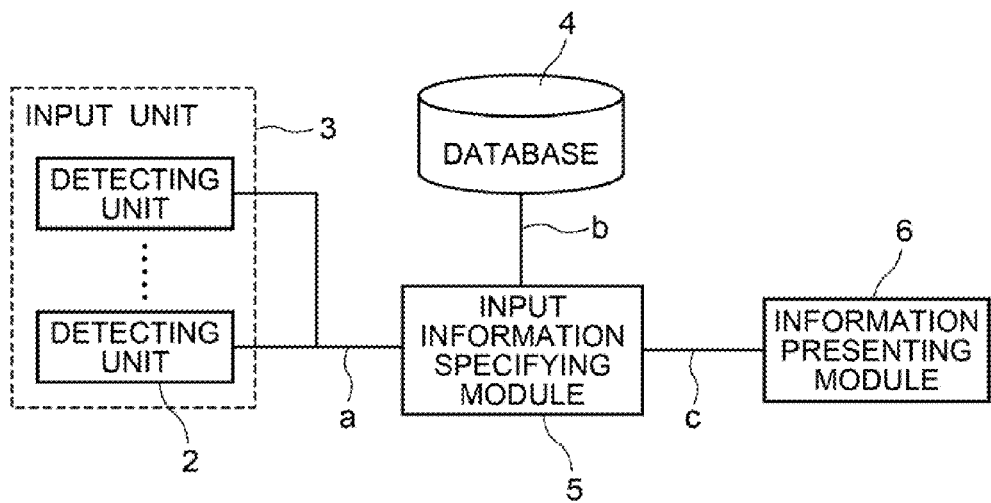
Figure 2:
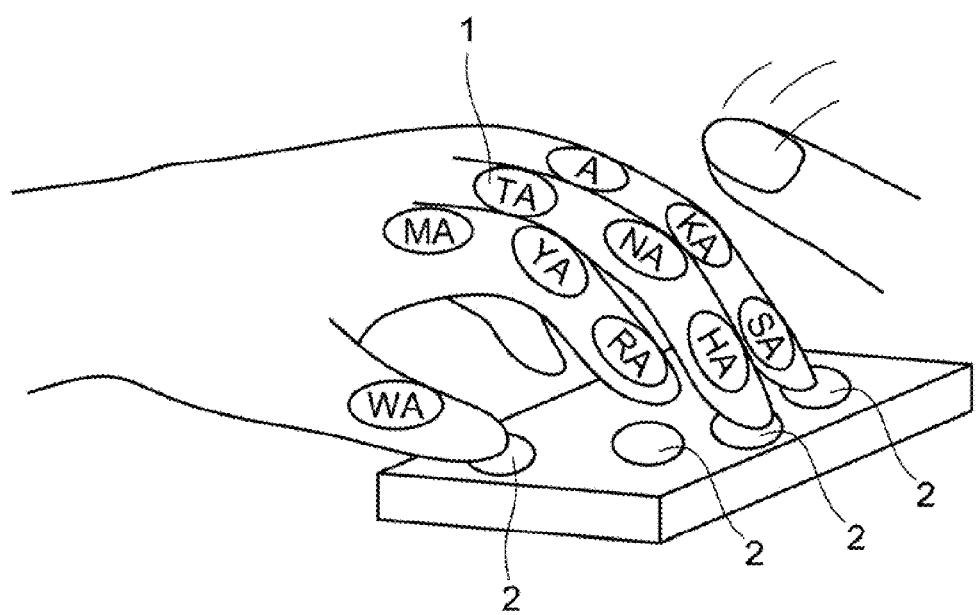
FIG. 2 is a perspective view showing a state where input to an input unit is to be done.
Figure 3:
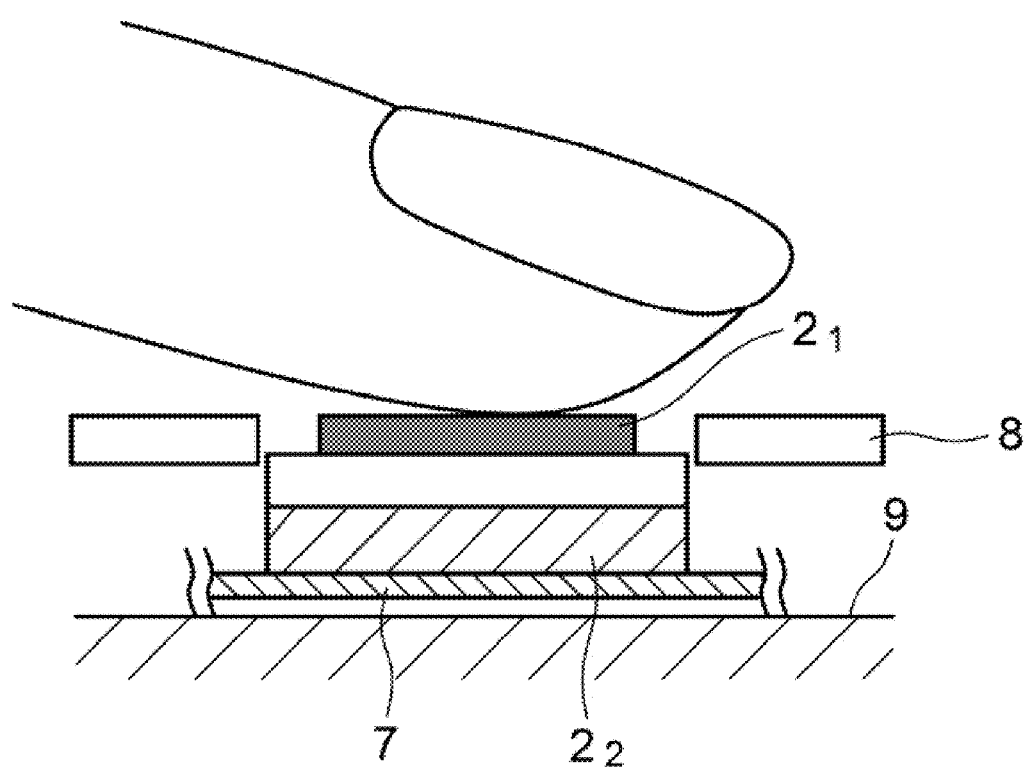
FIG. 3 is a sectional view of a detecting unit.
Figure 4:
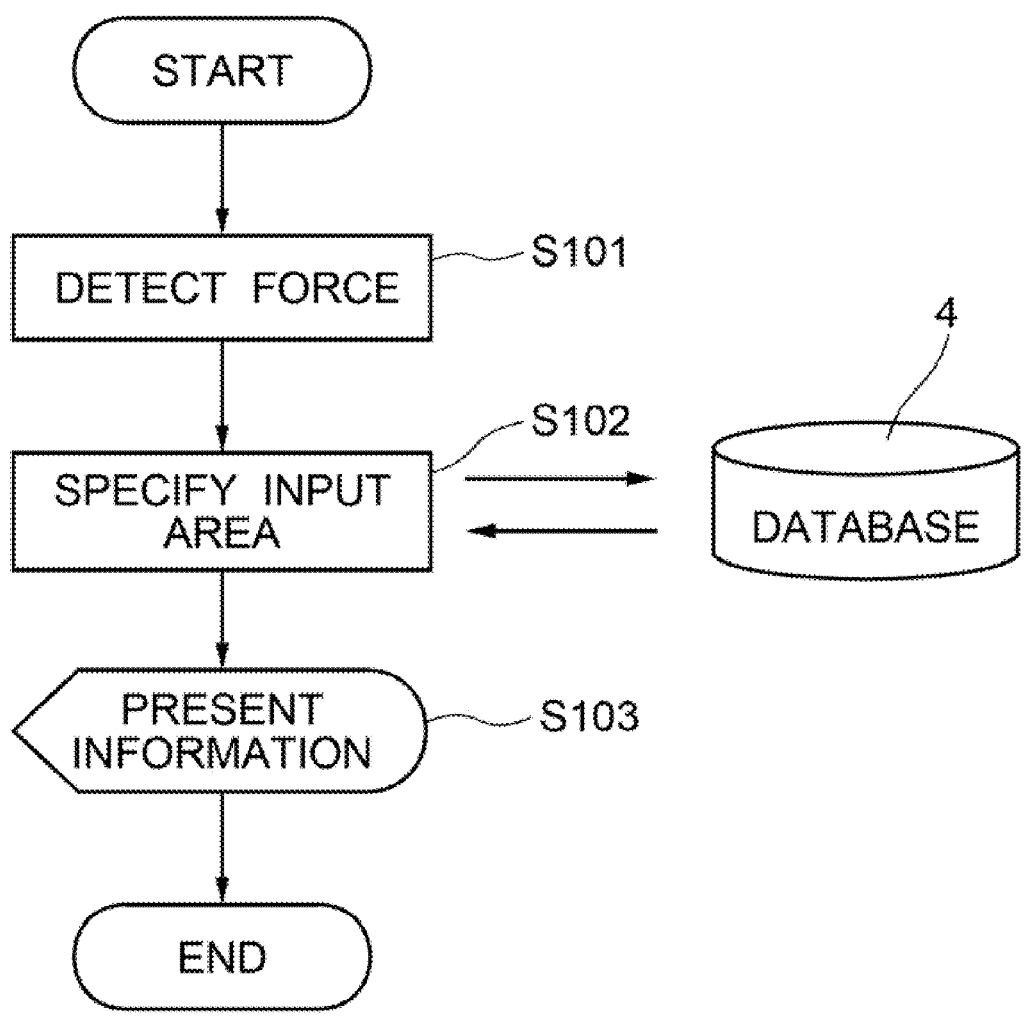
FIG. 4 is a flowchart showing actions of the first exemplary embodiment of the present invention.
Figure 5:
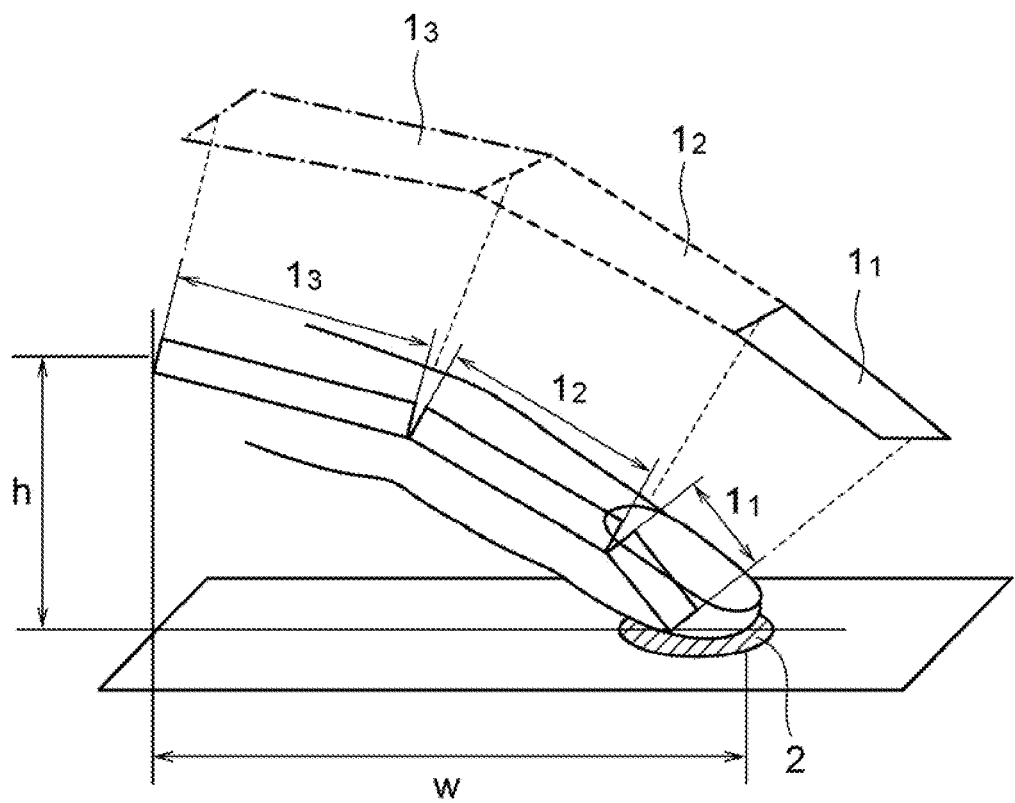
FIG. 5 is a schematic diagram showing a forefinger by dividing it at each joint.
Figure 6:
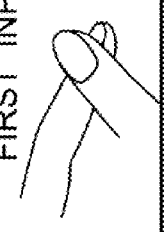
Figure 7:
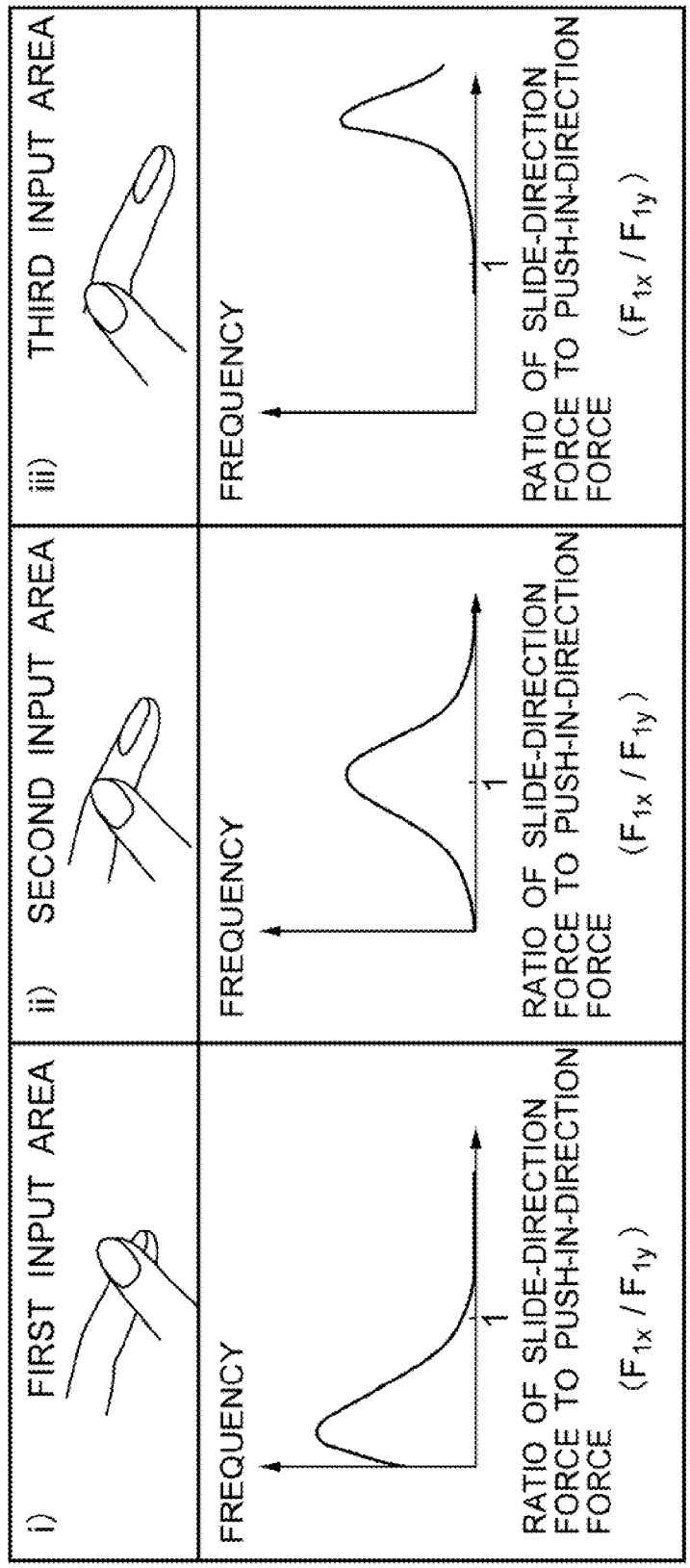
Figure 8:
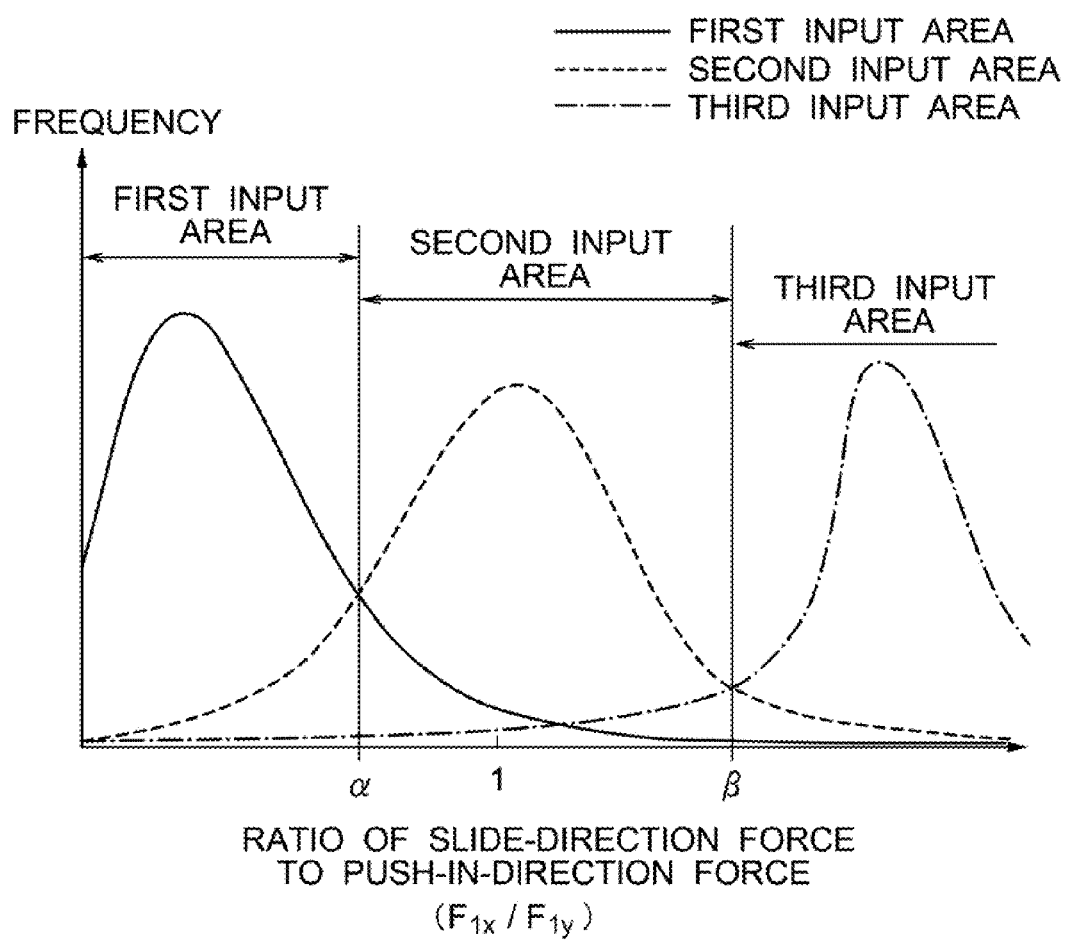
FIG. 8 is a graph (without insensible zone) for describing threshold values for specifying each input area.
Figure 9:
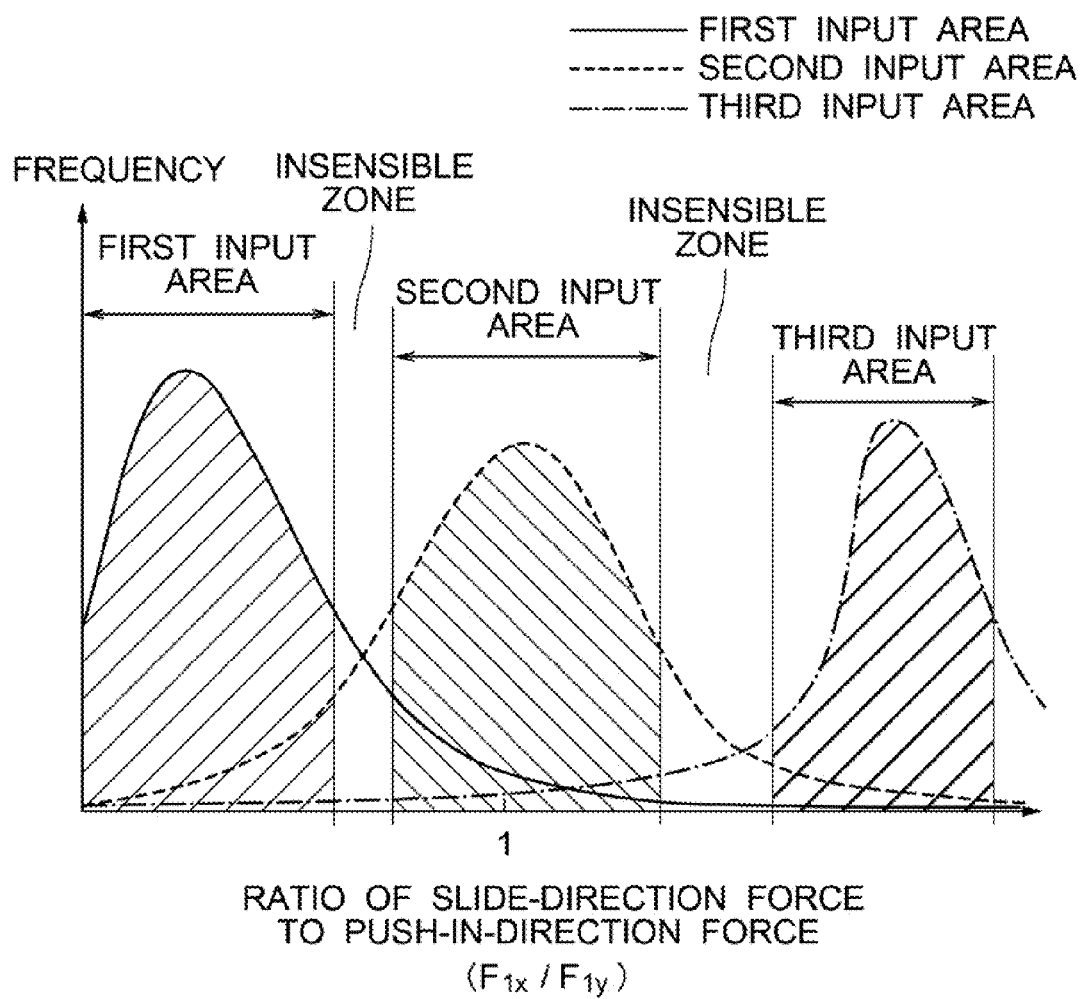
FIG. 9 is a graph (without insensible zone) for describing threshold values for specifying each input area.
Figure 11:
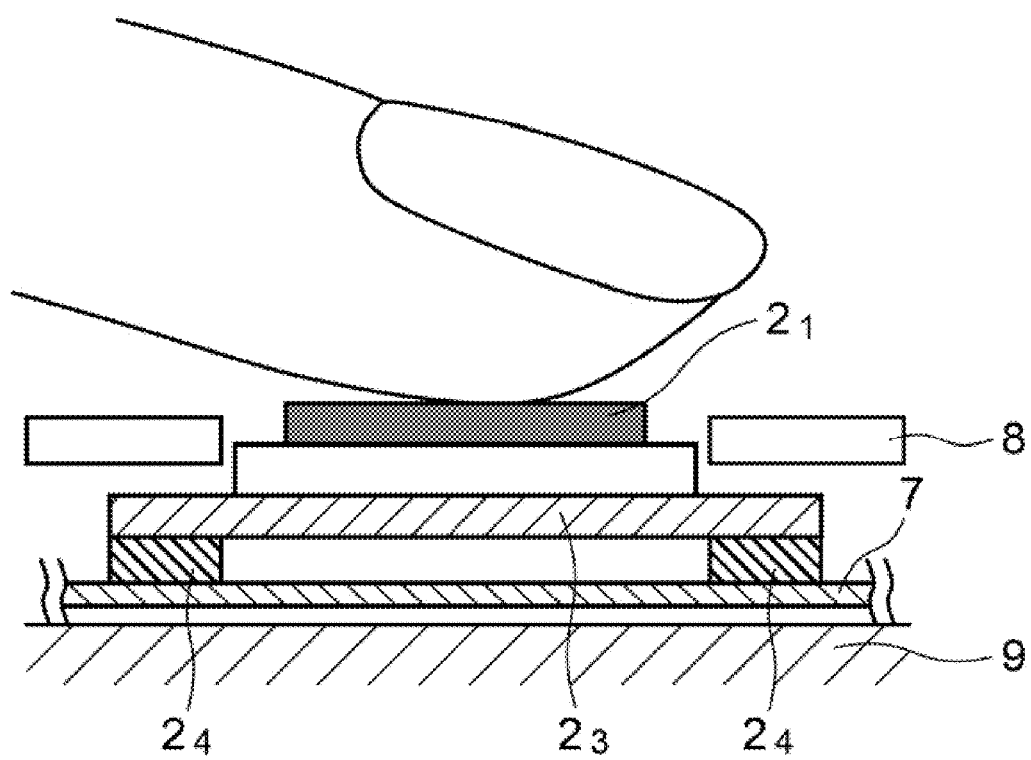
FIG. 11 is a sectional view showing the structure of a detecting unit used in an experiment.
Figure 12:
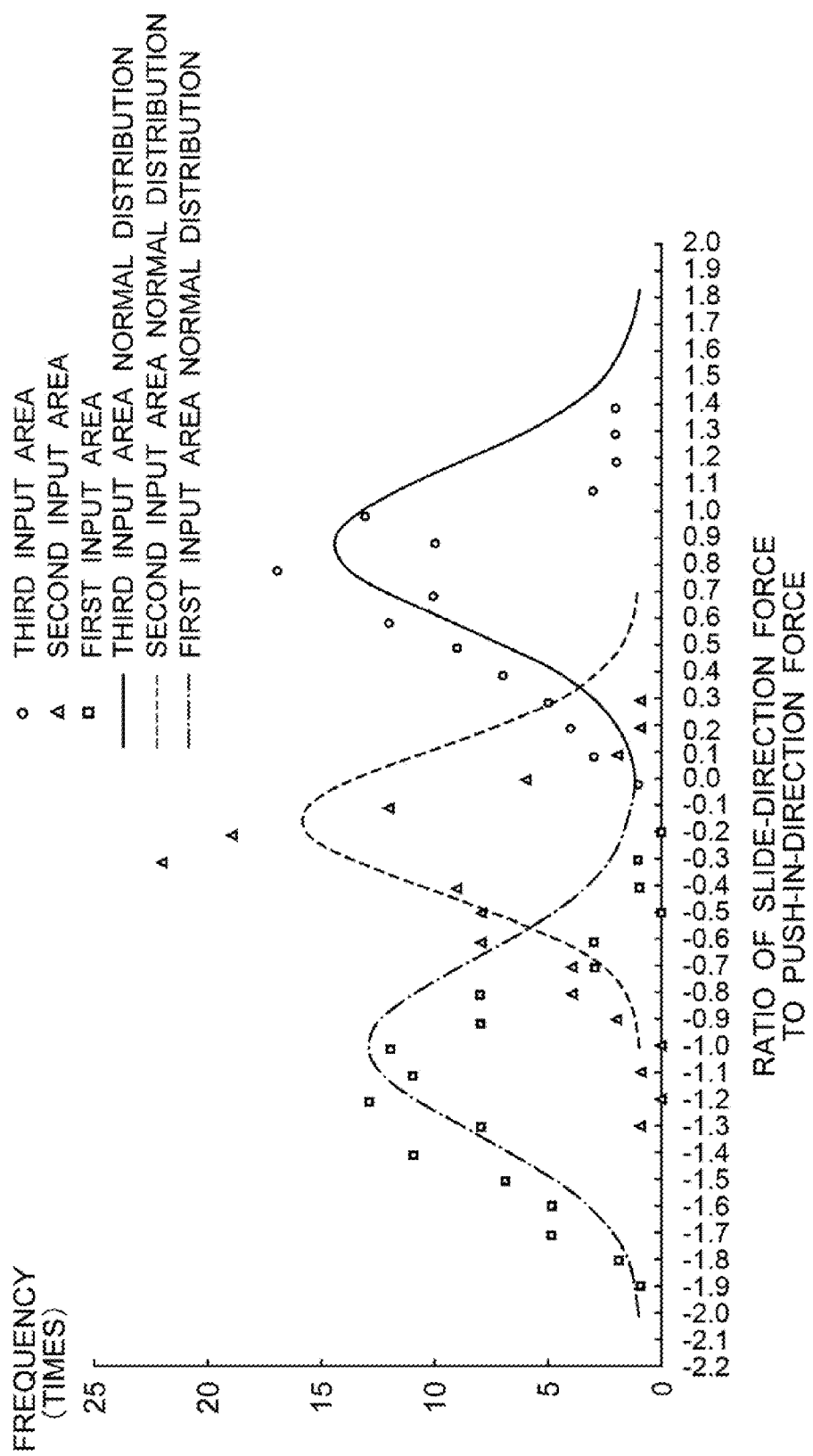
Figure 16:
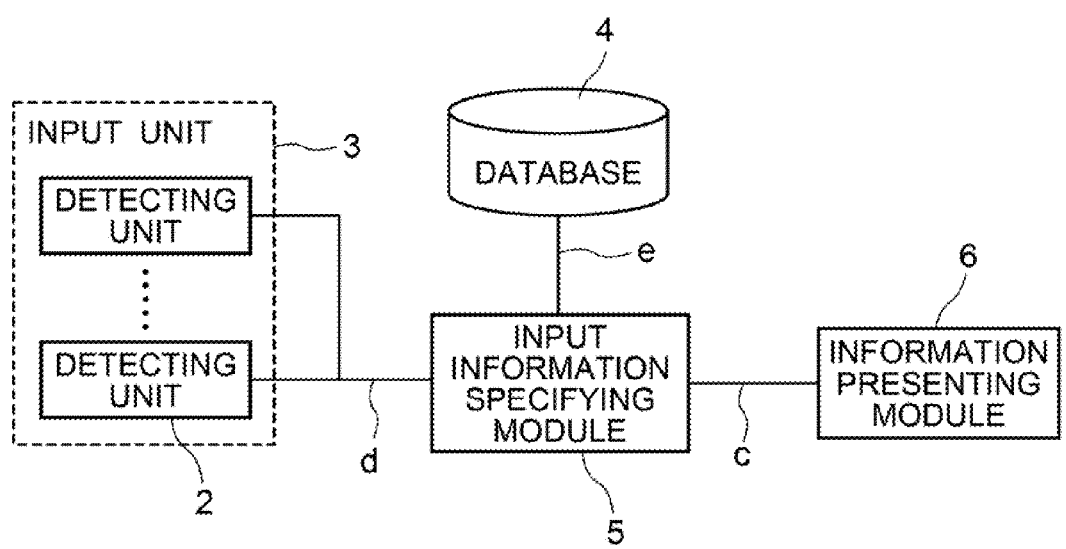
FIG. 16 is a block diagram showing the structure of a second exemplary embodiment of the input device according to the present invention.
Figure 17:
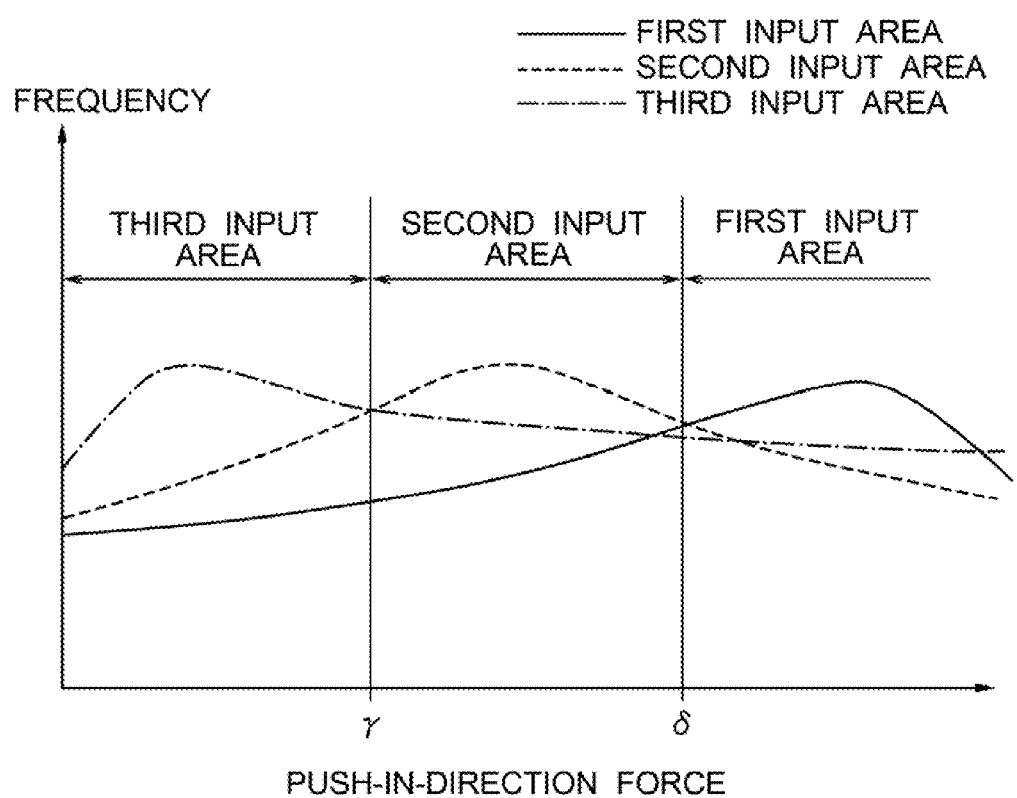
Figure 18:
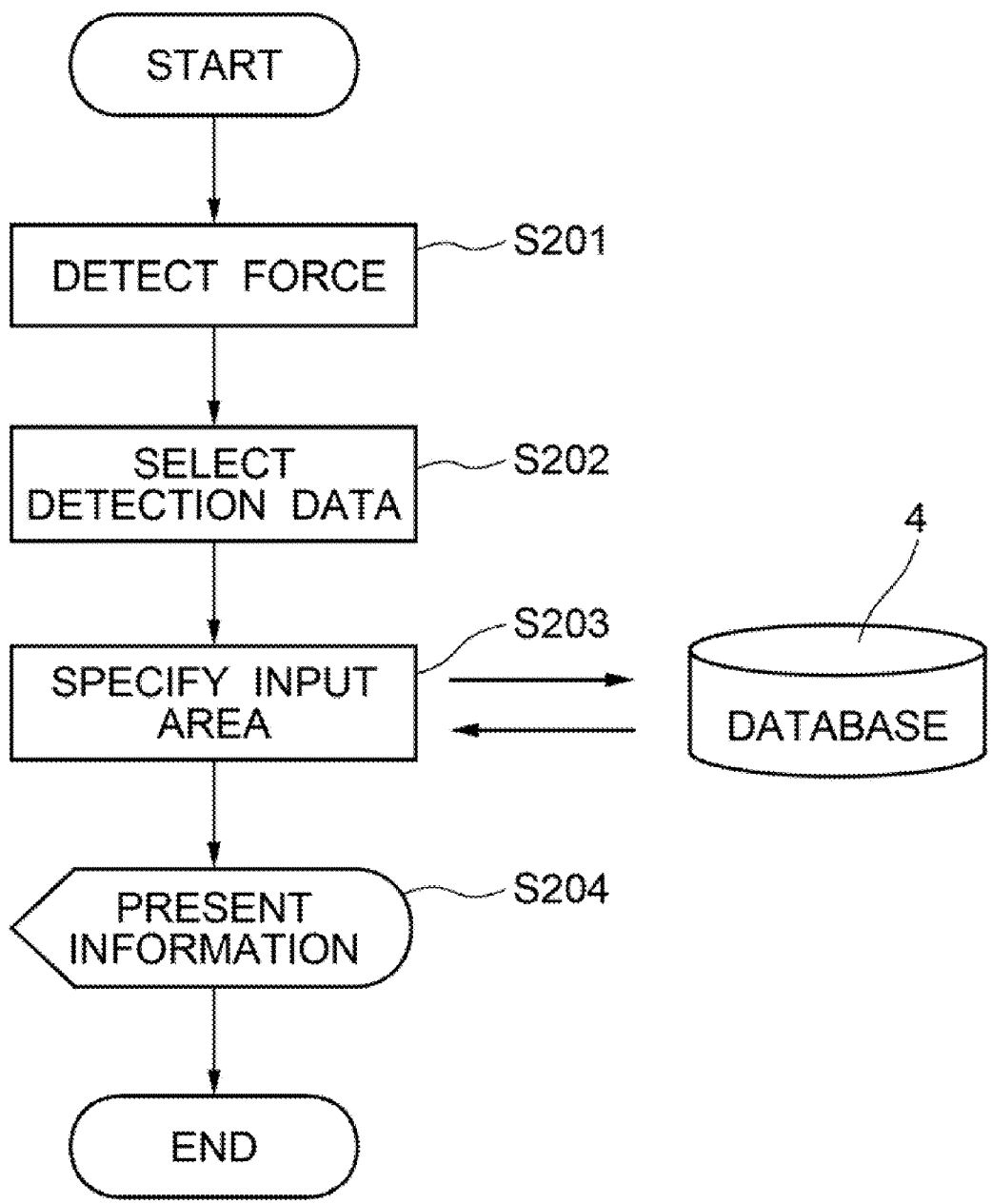
FIG. 18 is a flowchart showing actions of the second exemplary embodiment of the present invention.
Figure 19:
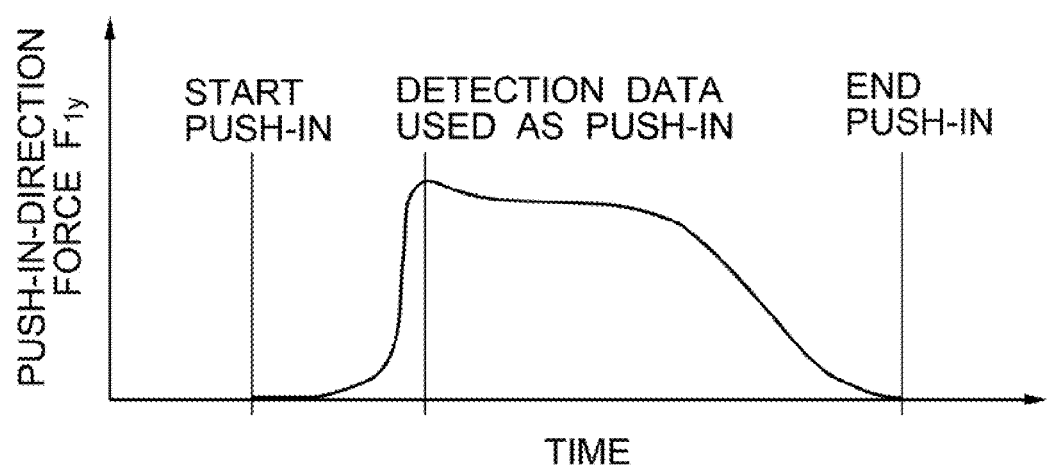
FIG. 19 is a graph showing chronological changes of the push-in direction force.
Figure 20:
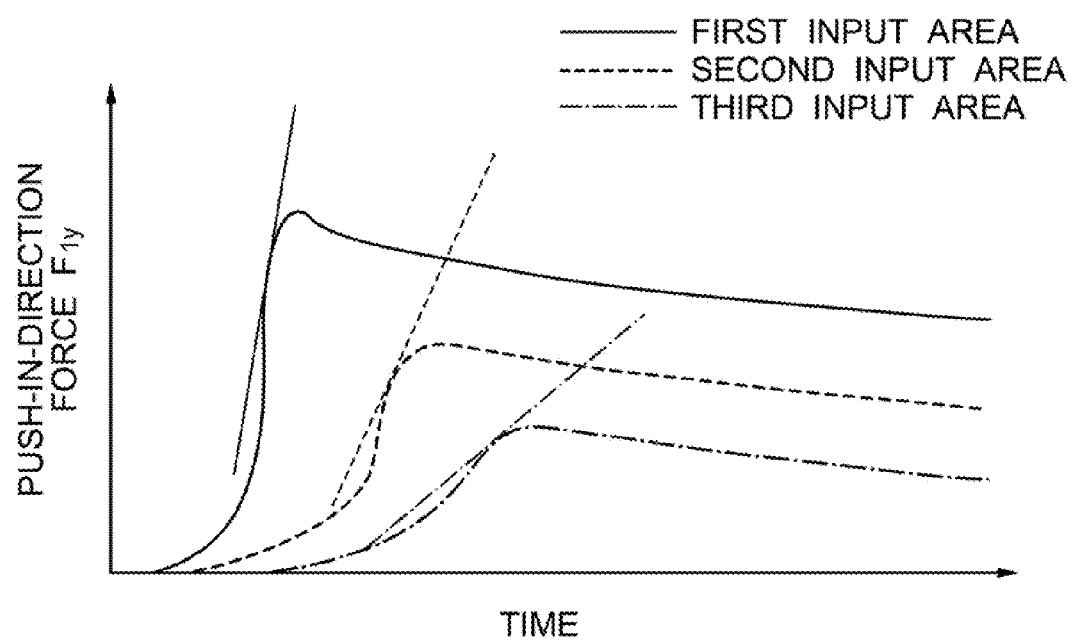
Figure 21:
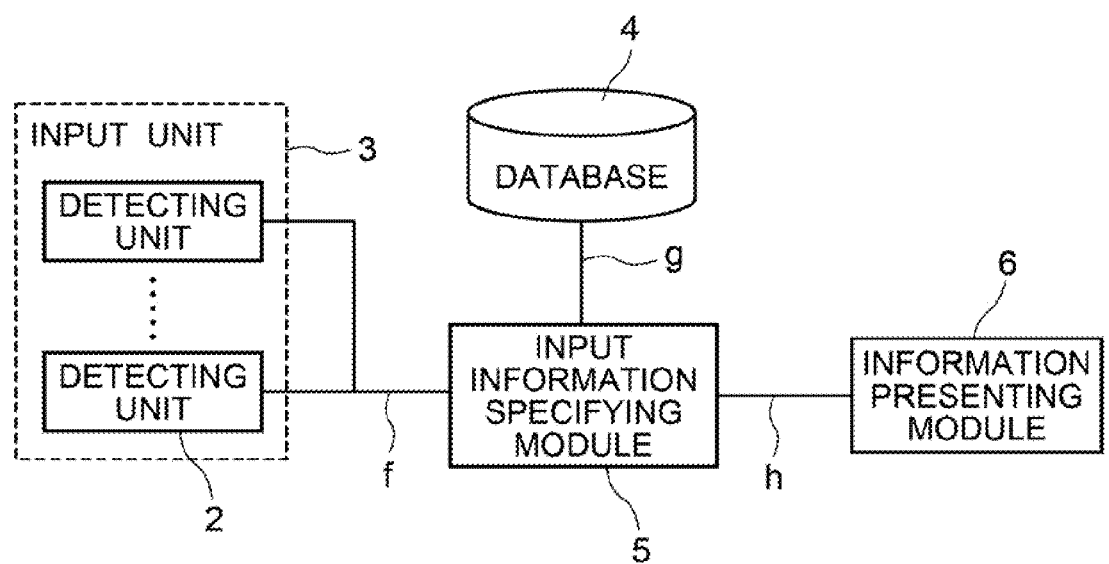
FIG. 21 is a block diagram showing the structure of a third exemplary embodiment of the input device according to the present invention.
Figure 22:
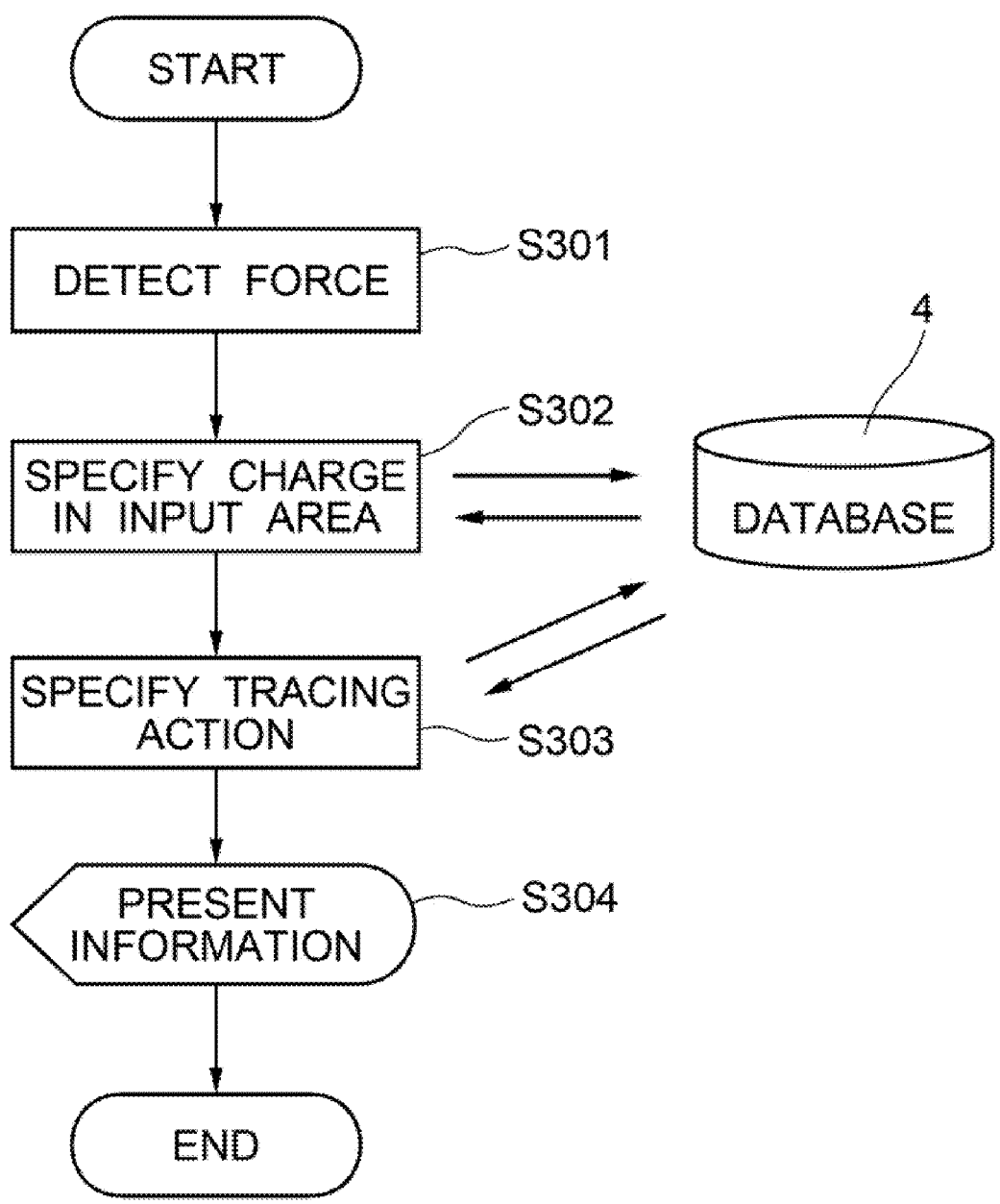
FIG. 22 is a flowchart showing actions of the third exemplary embodiment of the present invention.
Figure 23:
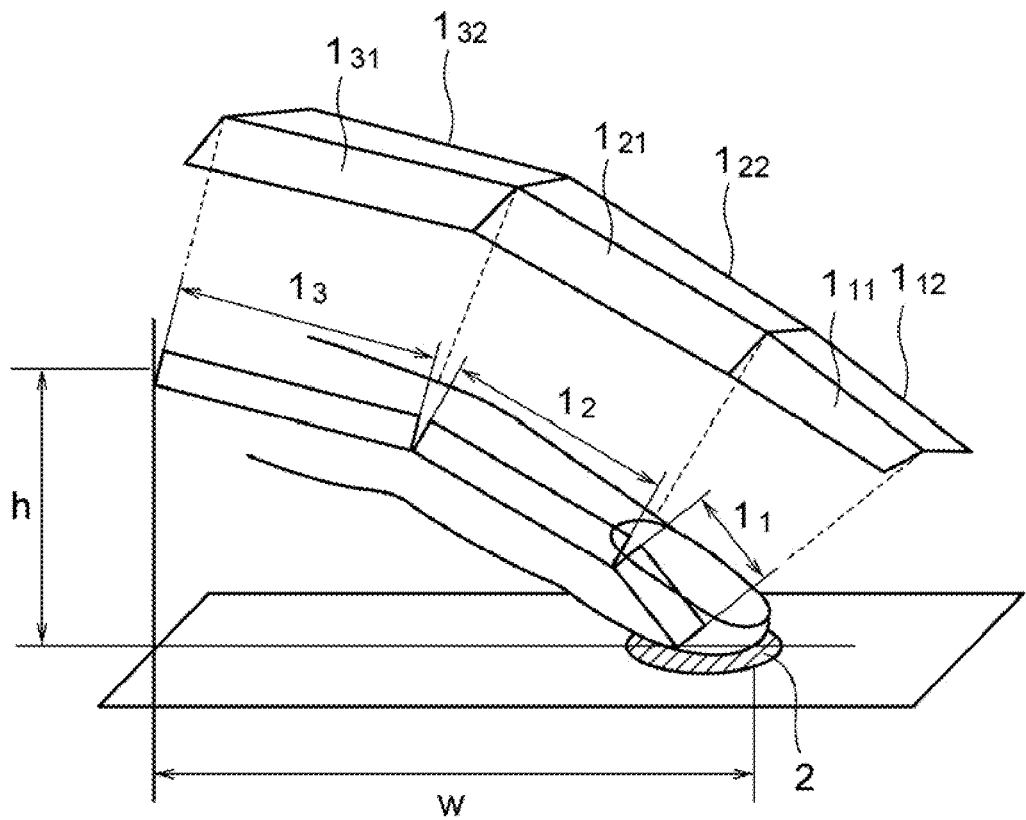
FIG. 23 is an illustration showing the first, second, and third input areas in a divided manner.
Figure 24B:
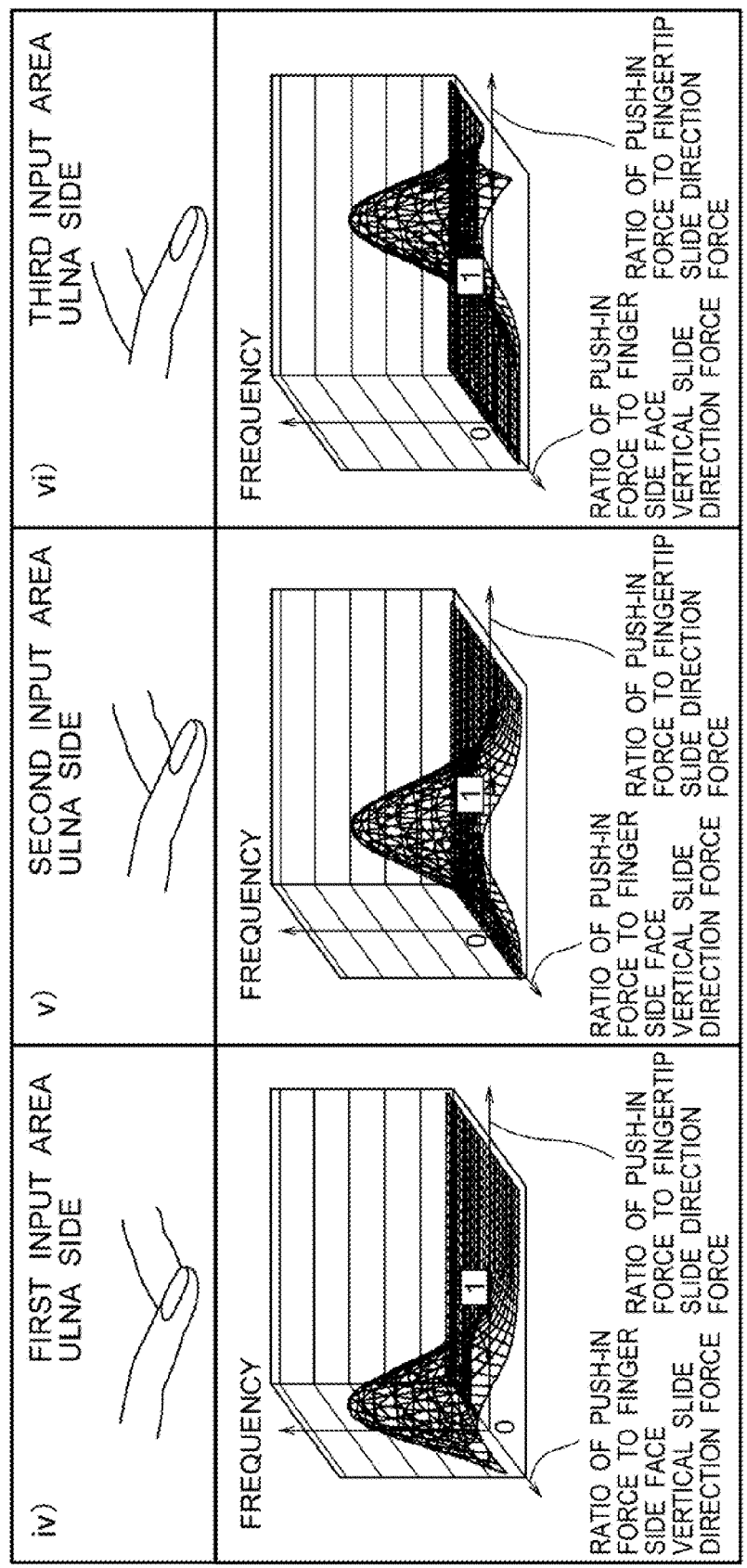
Figure 27:
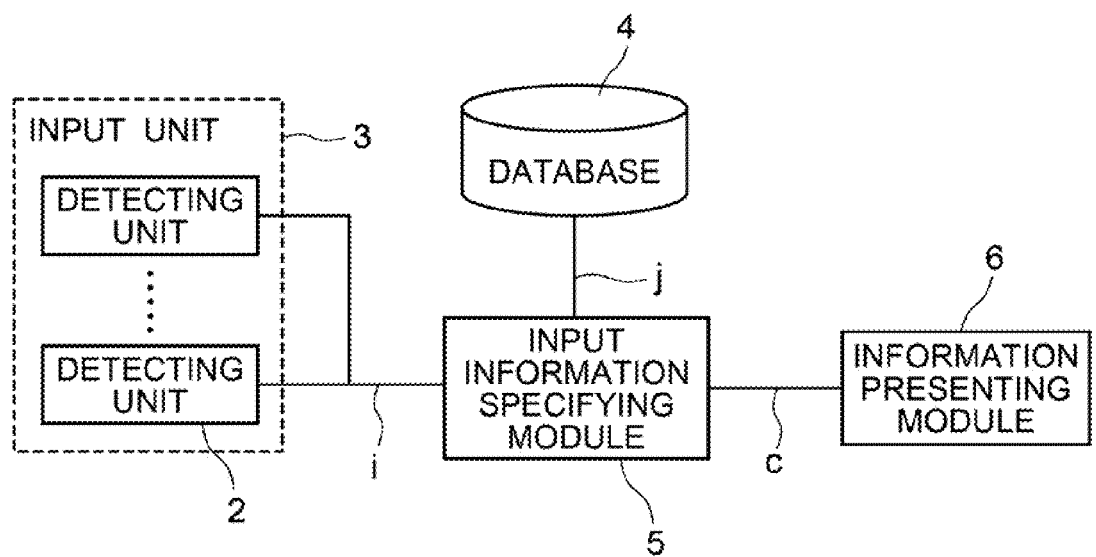
FIG. 27 is a block diagram showing the structure of a fourth exemplary embodiment of the input device according to the present invention.
Figure 28:
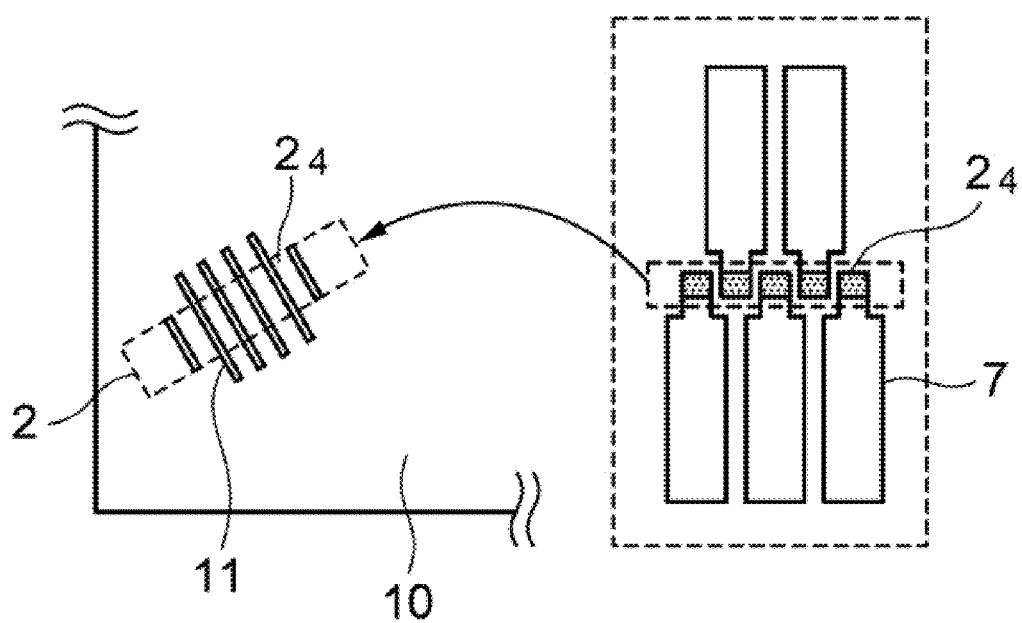
FIG. 28 is a plan view of a detecting unit according to the fourth exemplary embodiment.
Figure 29:
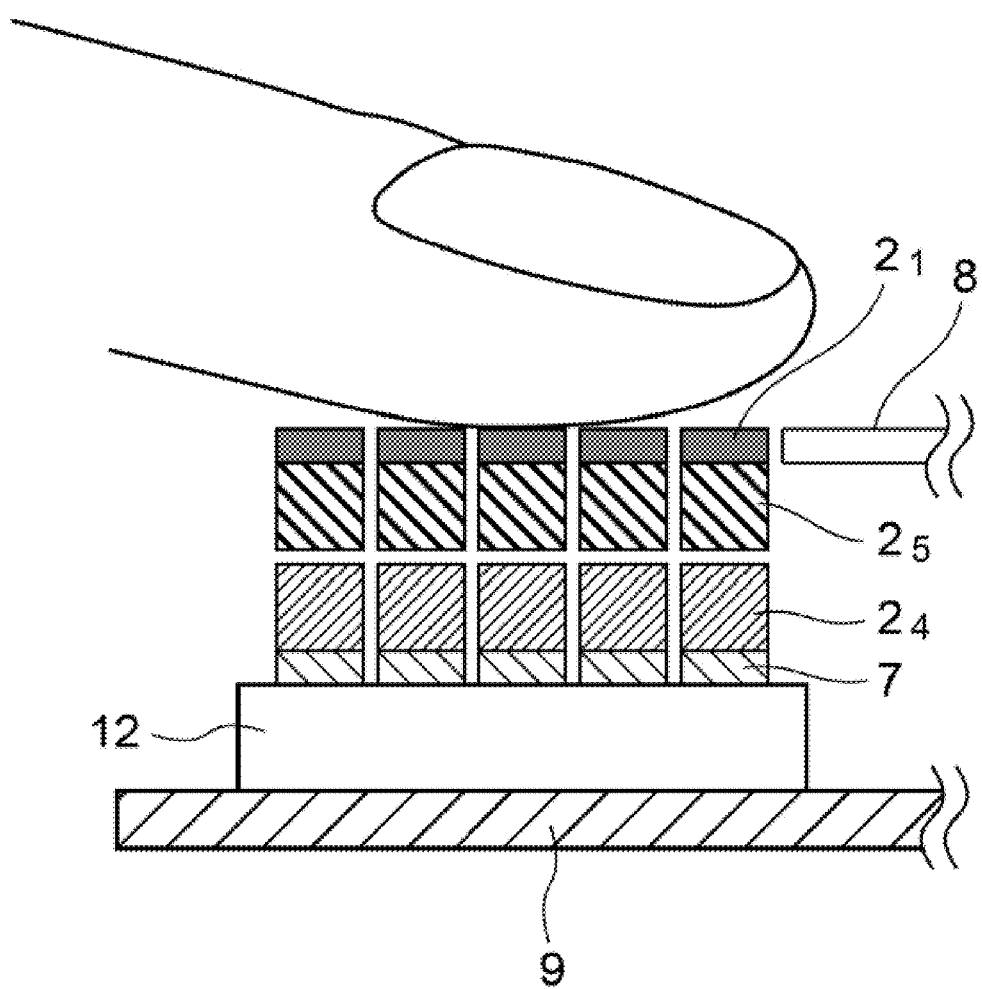
FIG. 29 is a sectional view showing the structure of the detecting unit according to the fourth exemplary embodiment.
Figure 30:
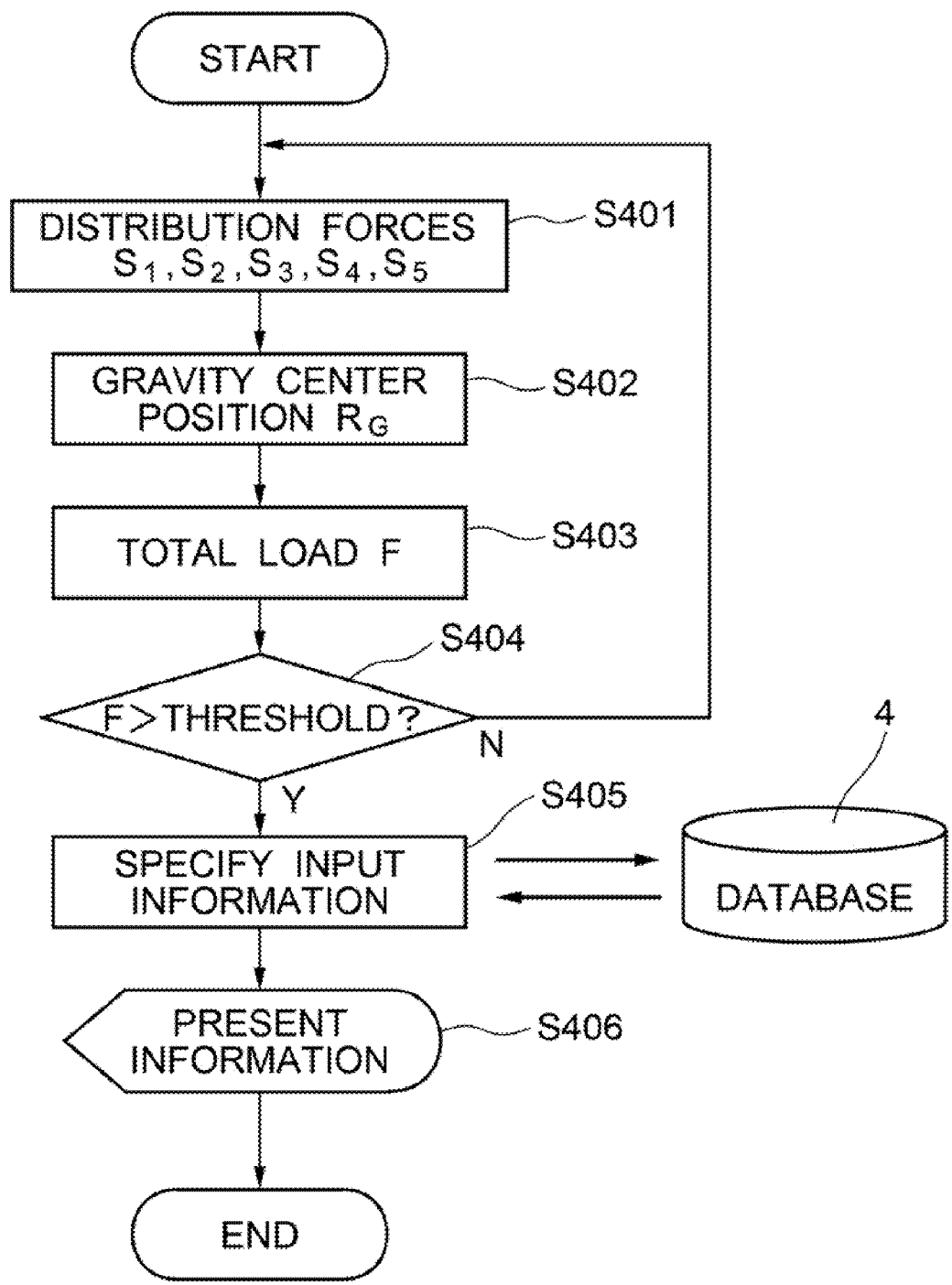
FIG. 30 is a flowchart showing actions of the fourth exemplary embodiment of the present invention.
Figure 31:
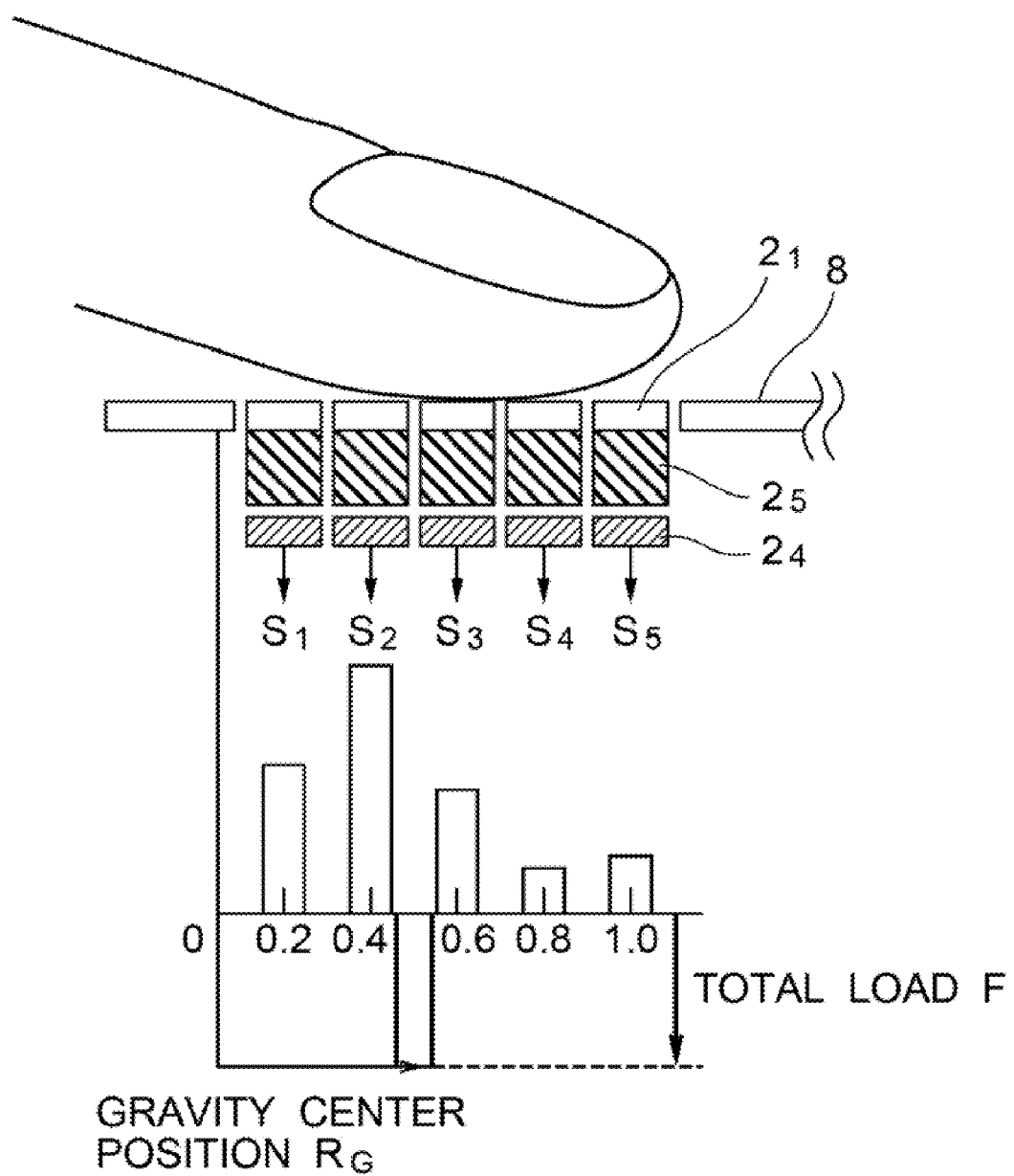
FIG. 31 is an illustration for describing the load gravity center position and total load of the fourth exemplary embodiment.
Figure 32:
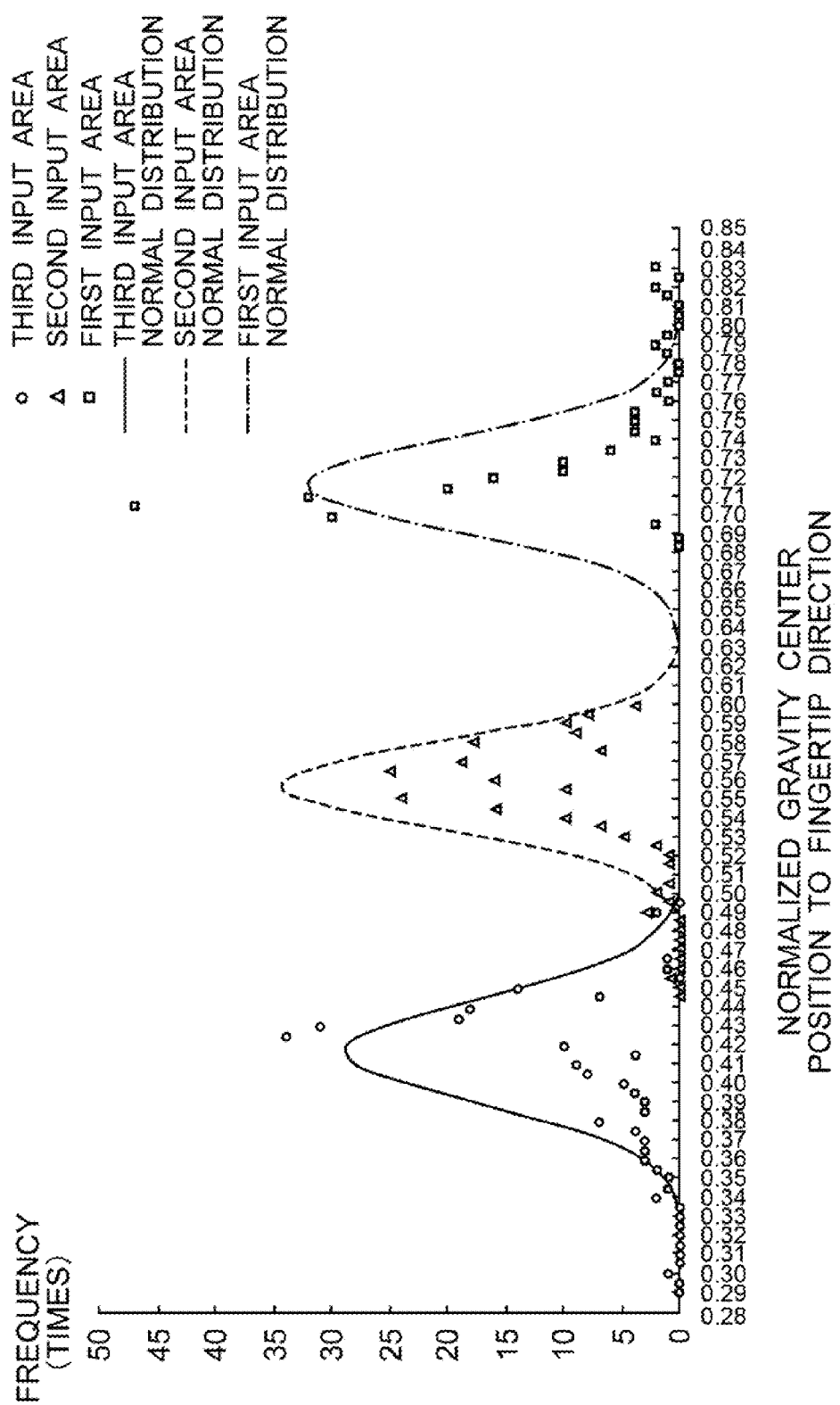
Figure 35:
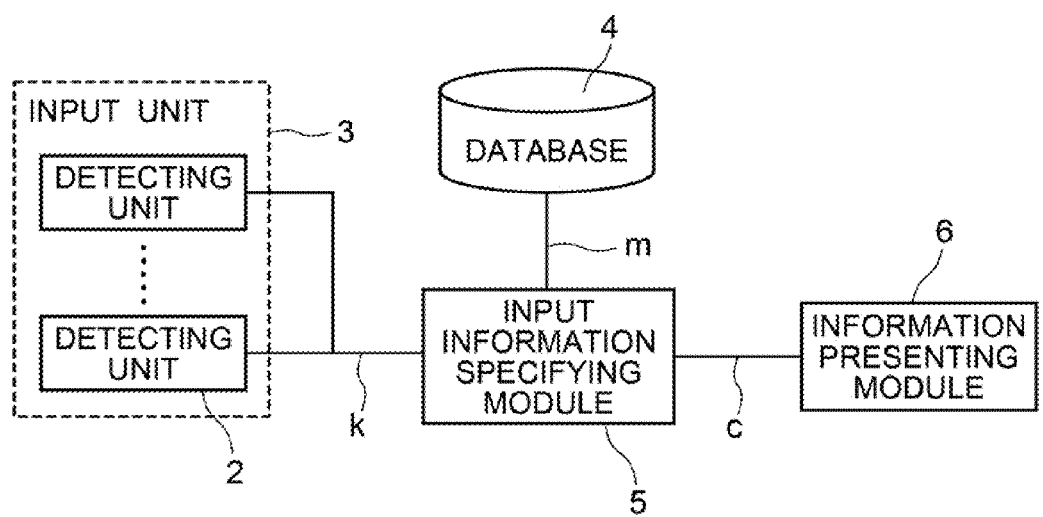
FIG. 35 is a block diagram showing the structure of a fifth exemplary embodiment according to the present invention.
Figure 36:
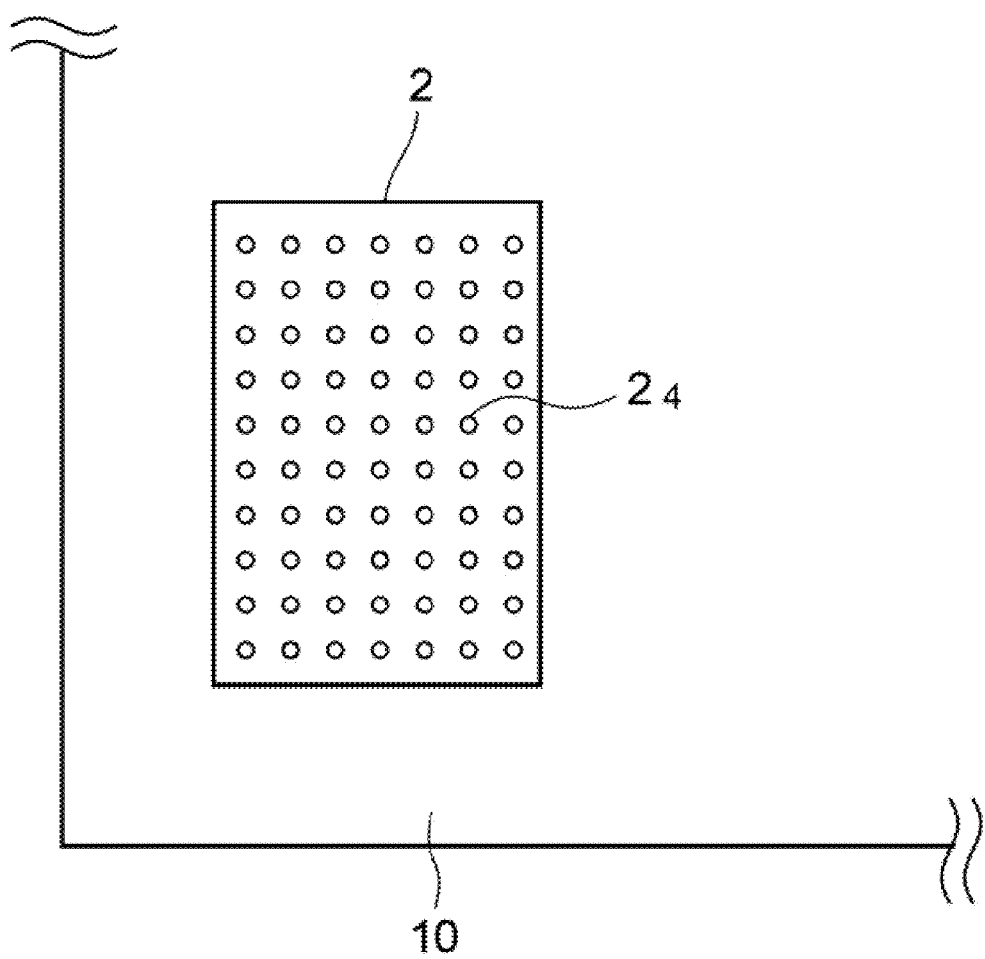
FIG. 36 is a plan view showing the structure of a detecting unit according to the fifth exemplary embodiment.
Figure 37:
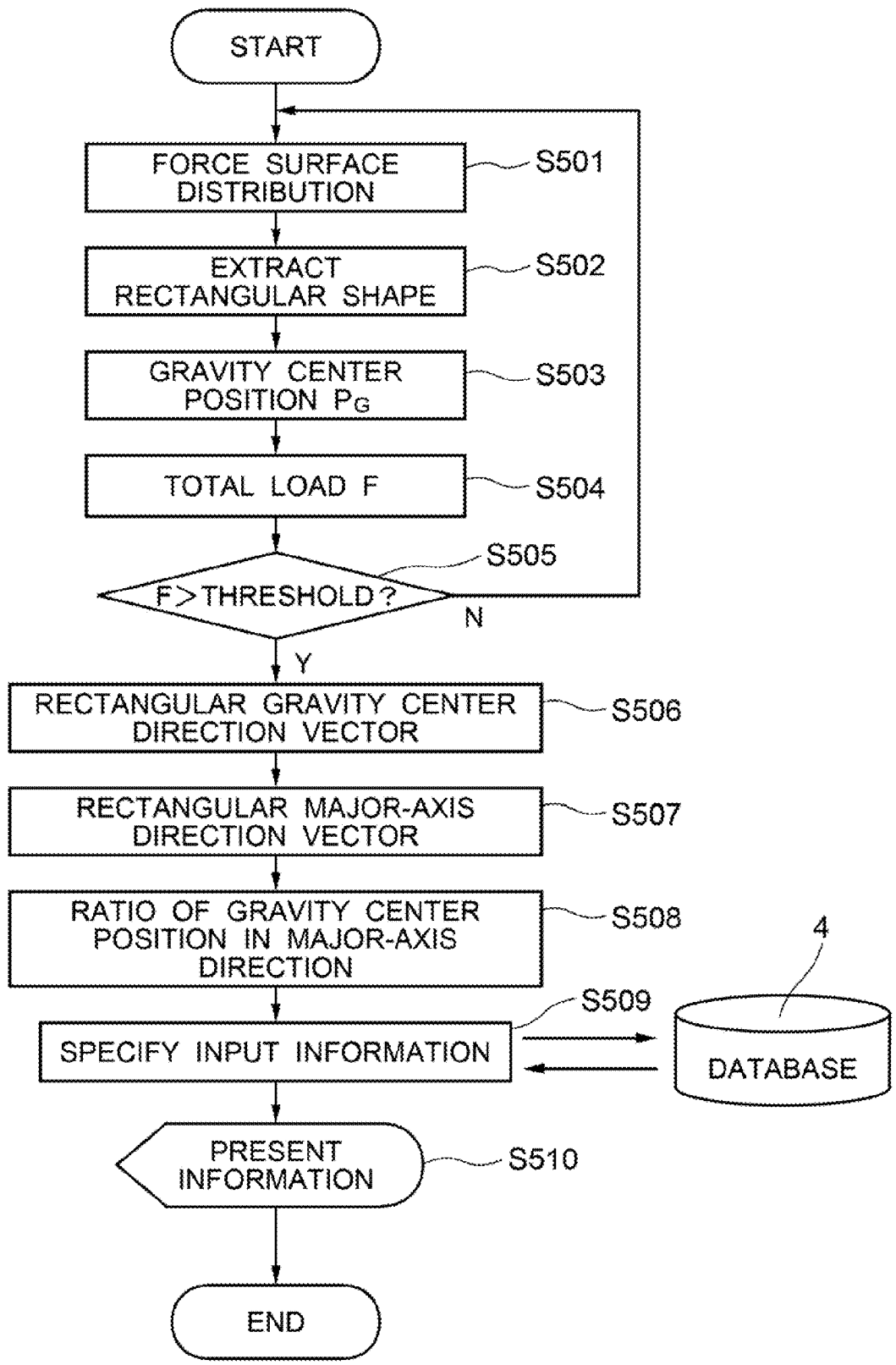
FIG. 37 is a flowchart showing actions of the input device according to the fifth exemplary embodiment.
Figure 38:
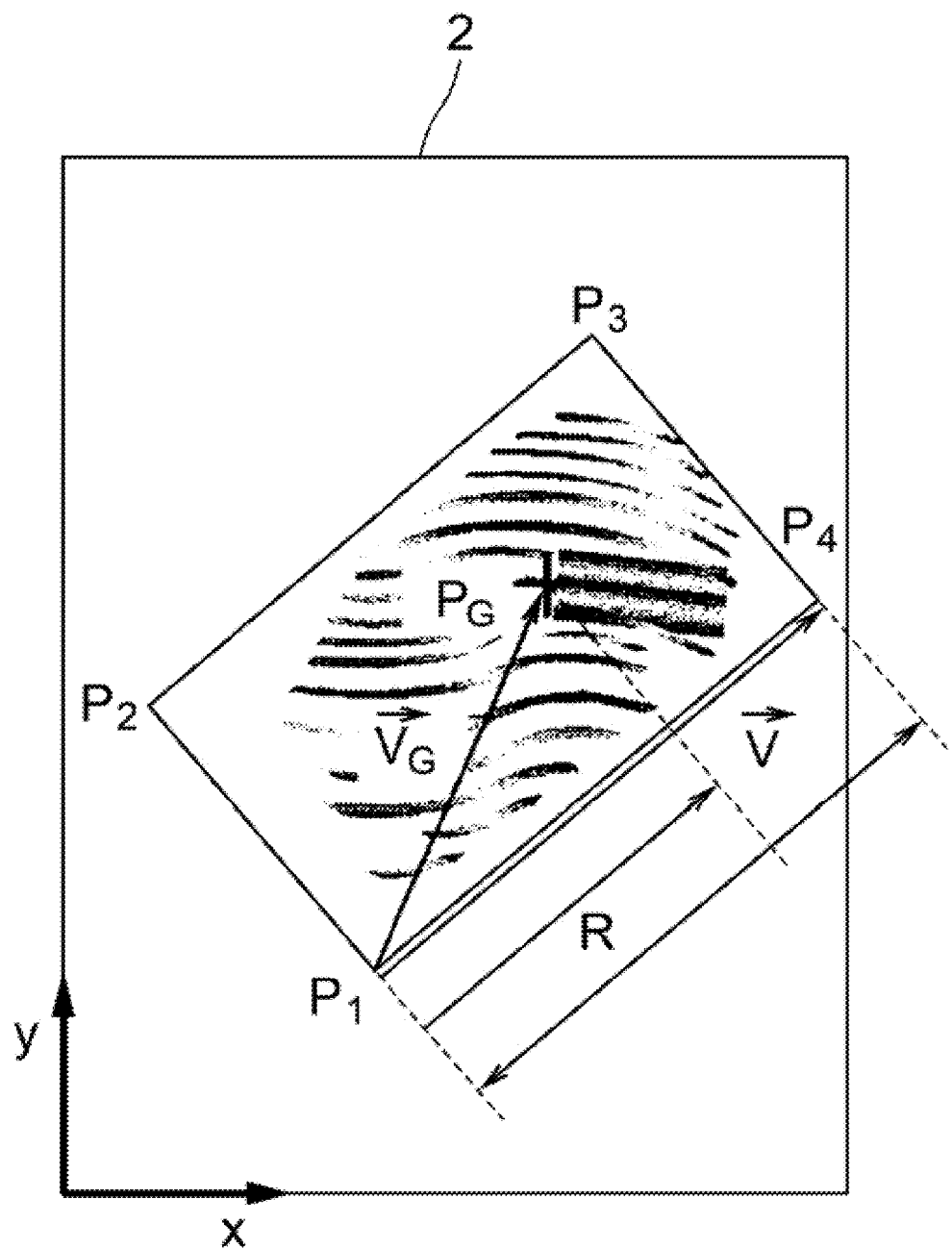
FIG. 38 is an explanatory chart showing a pressure-sensitive distribution state according to the fifth exemplary embodiment.
Figure 39:
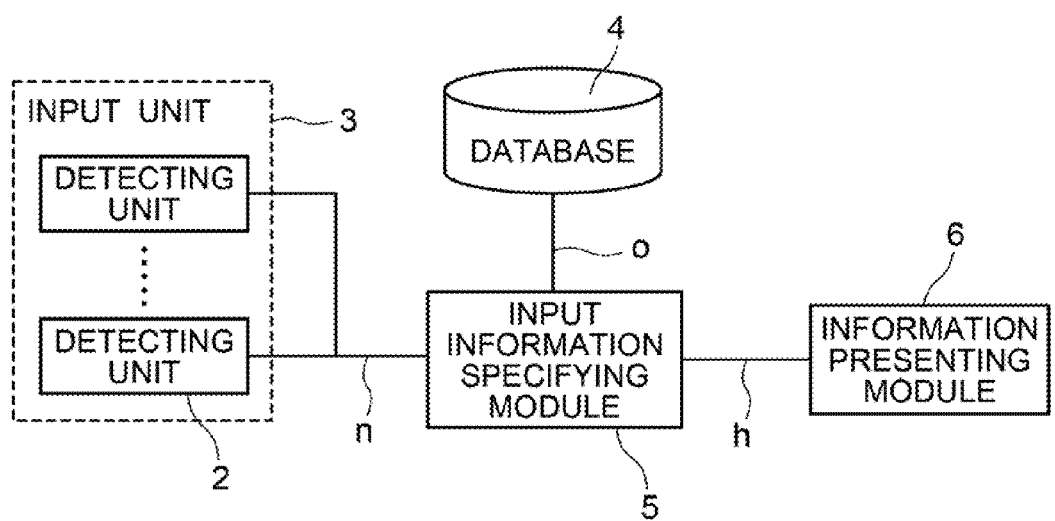
FIG. 39 is a block diagram showing the structure of a sixth exemplary embodiment according to the present invention.
Figure 40:
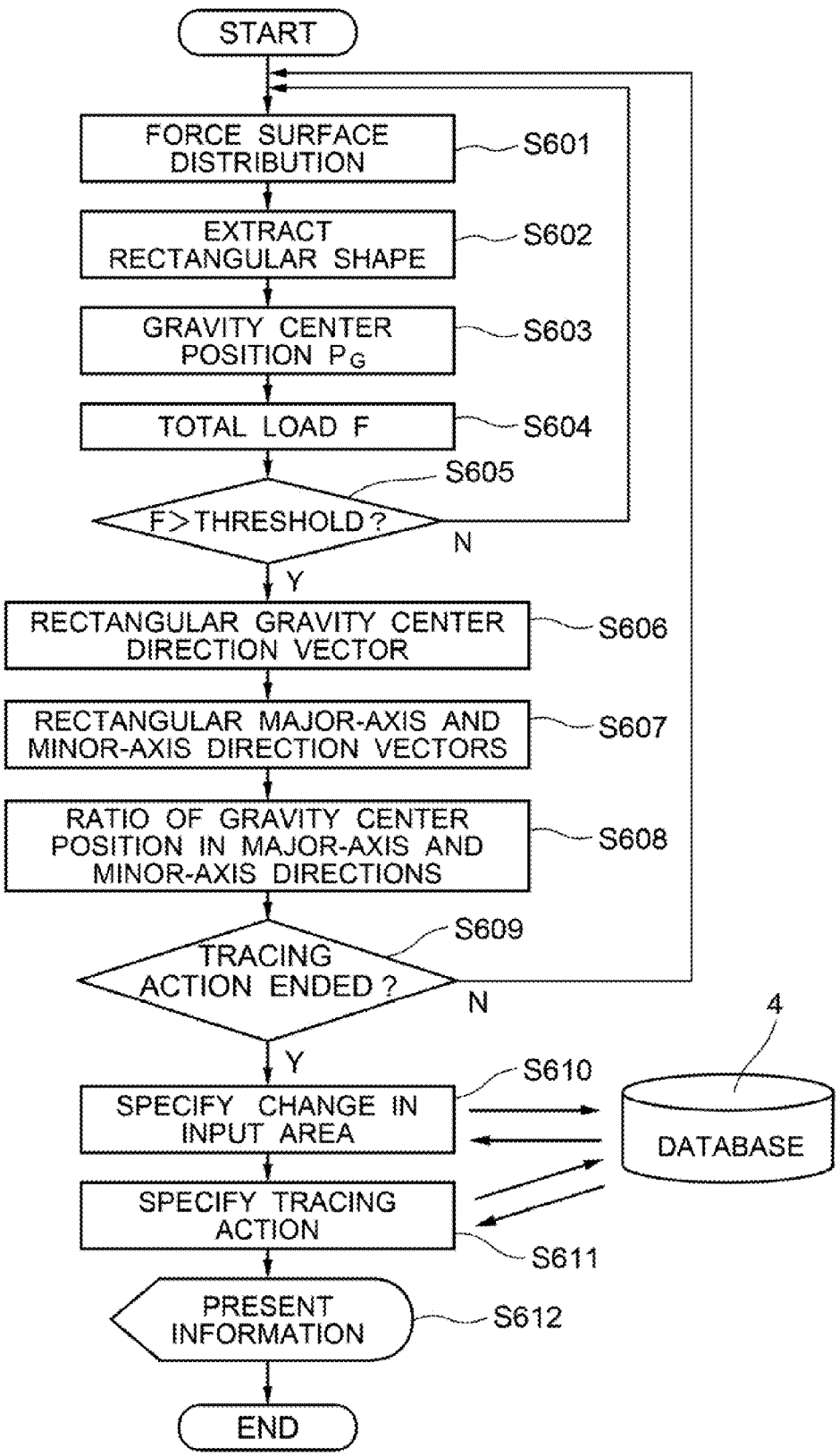
FIG. 40 is a flowchart showing actions of the input device according to the sixth exemplary embodiment.
Figure 41A:
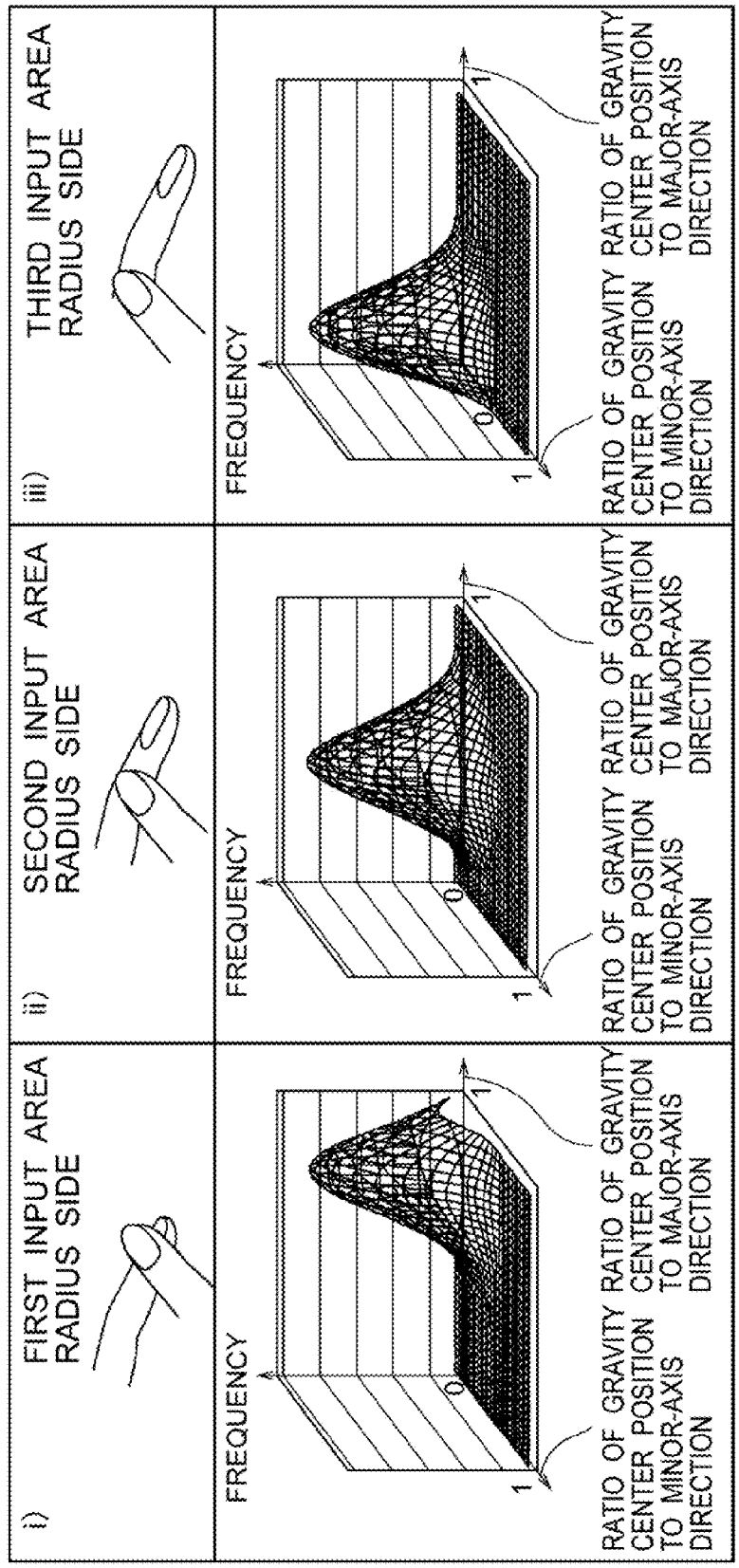
Figure 41B:
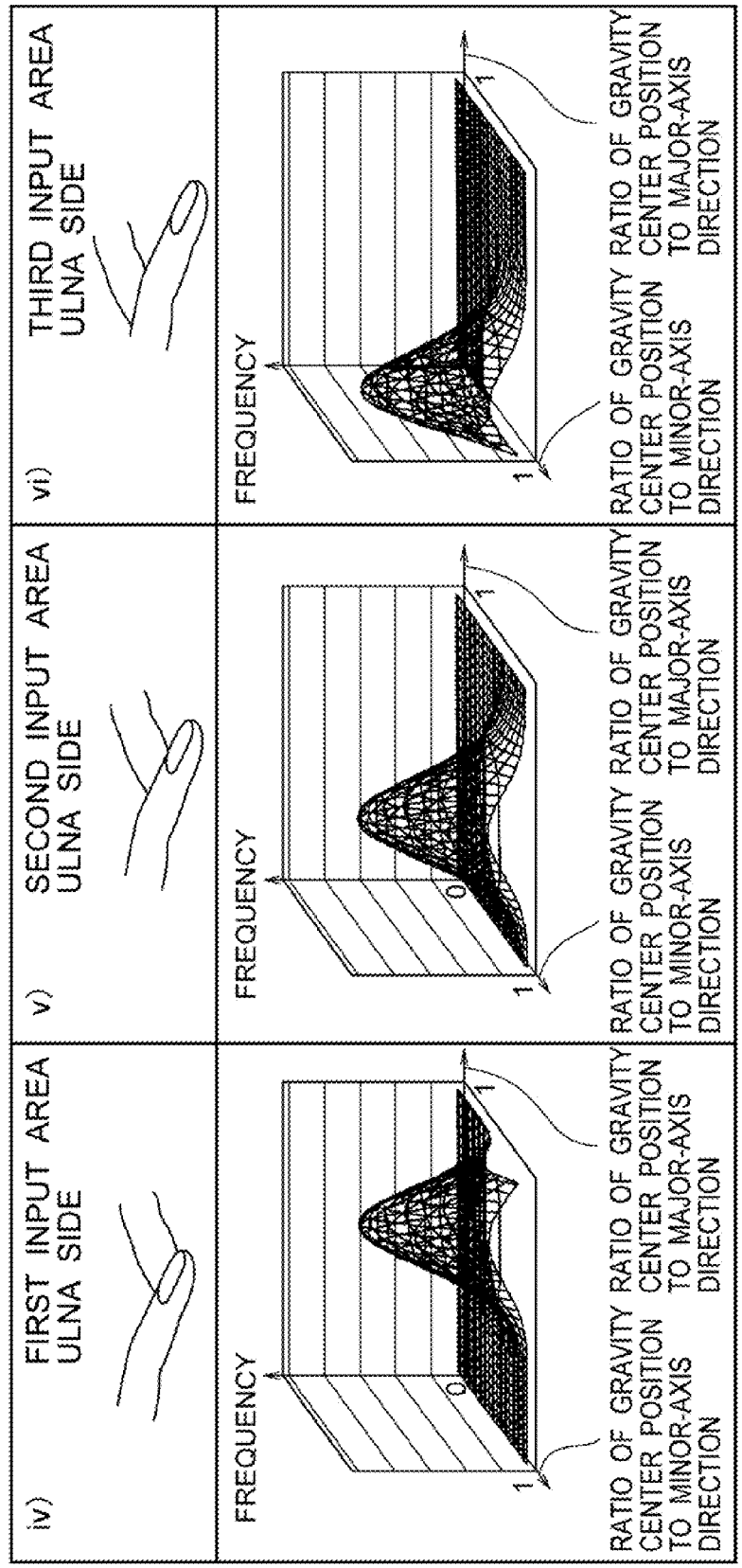
Figure 42A:
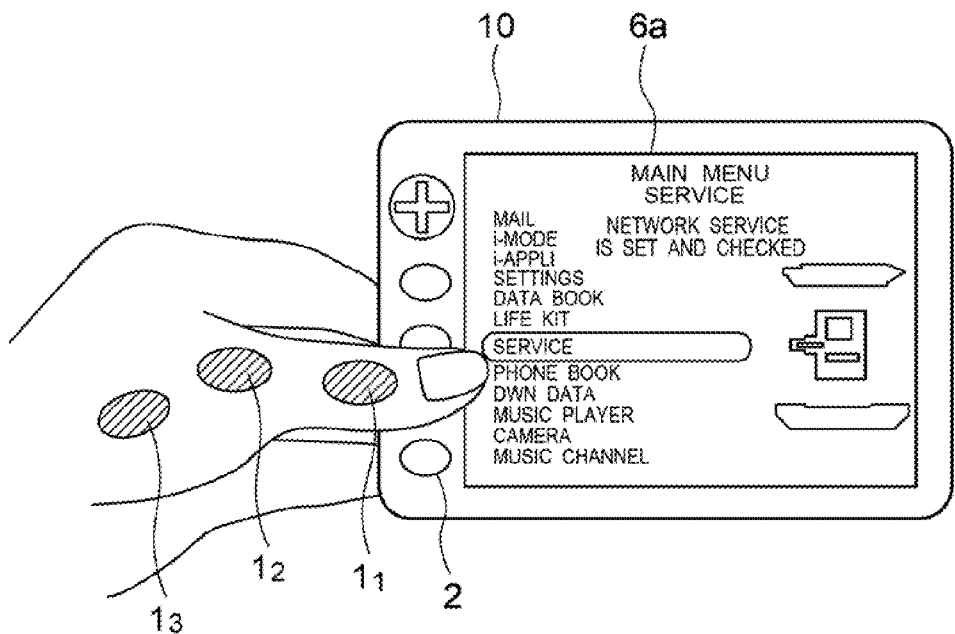
FIG. 42 is a perspective view of EXAMPLE 1 of the present invention.
Figure 42B:
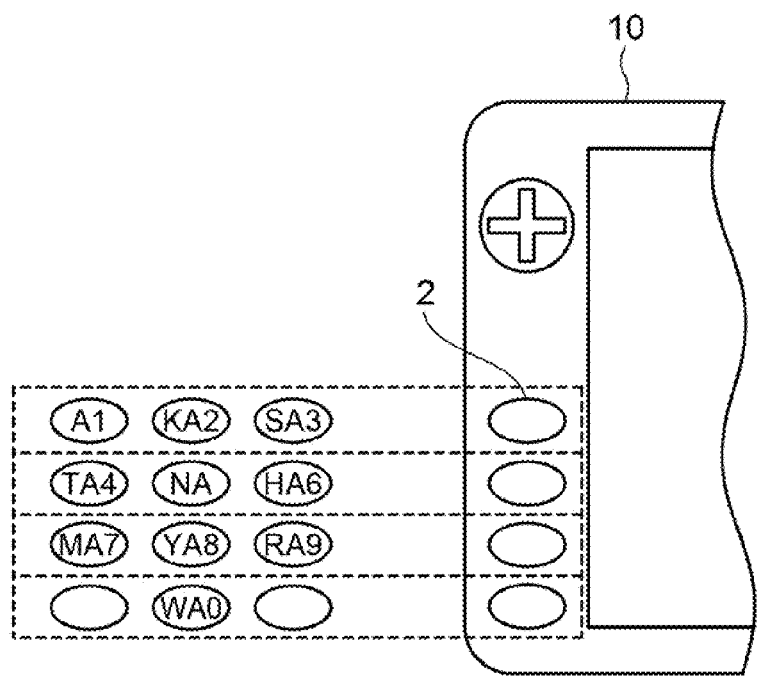
Figure 43:
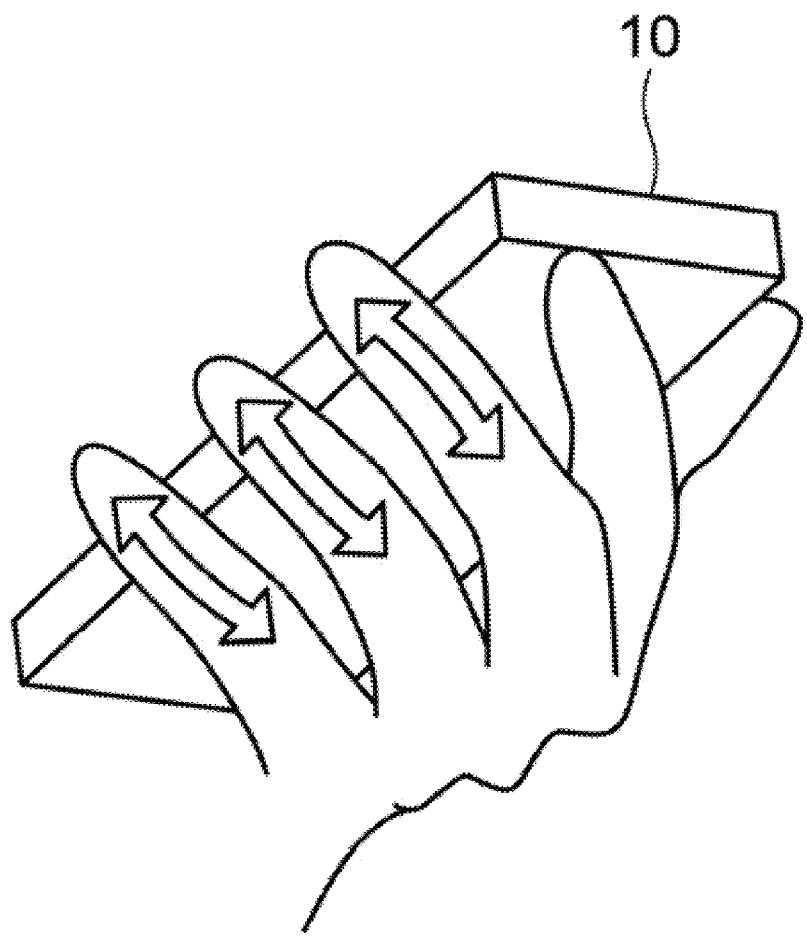
FIG. 43 is a perspective view of EXAMPLE 2 of the present invention.
Figure 44:
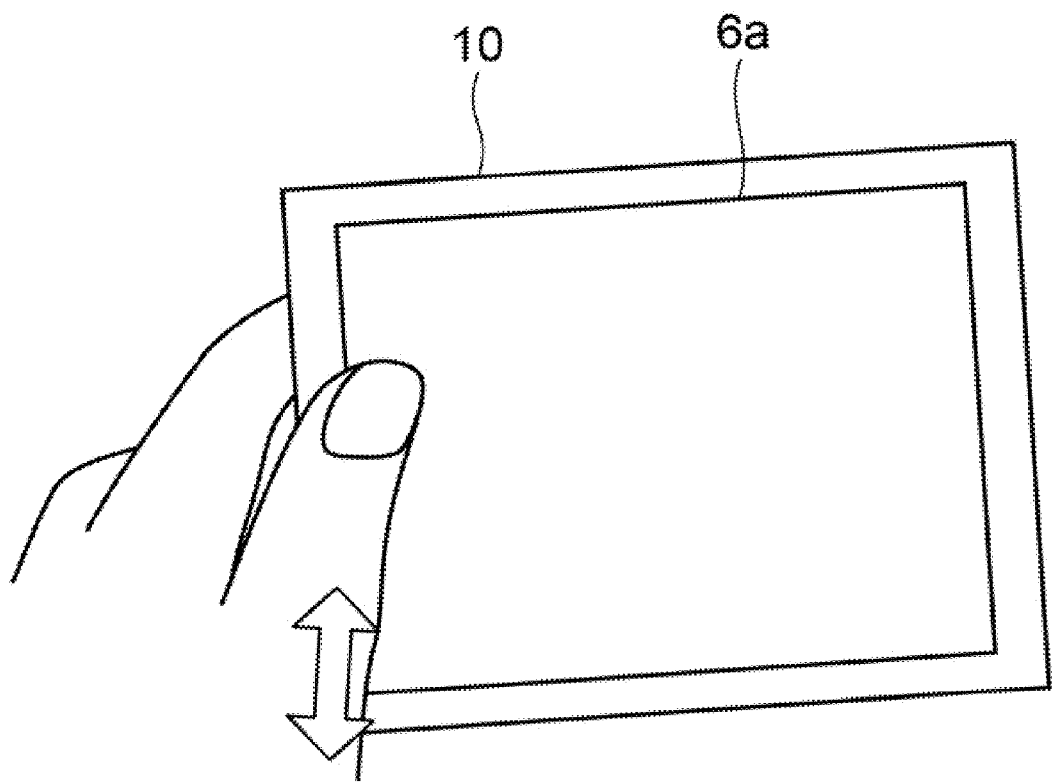
FIG. 44 is a perspective view of EXAMPLE 3 of the present invention.
Figure 45:
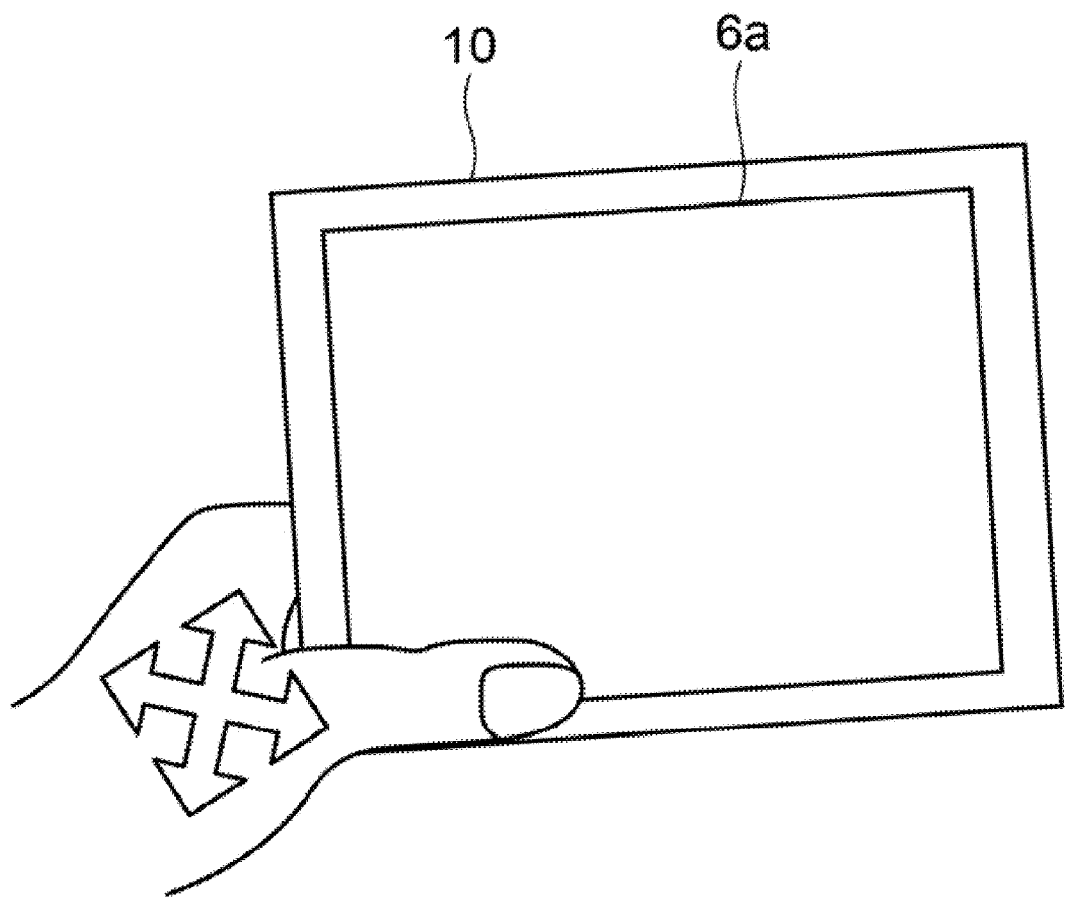
FIG. 45 is a perspective view of EXAMPLE 4 of the present invention.

1 Input area
$1_1$ First input area
$1_{11}$ First input area radius side
$1_{12}$ First input area ulna side
$1_2$ Second input area
$1_{21}$ Second input area radius side
$1_{22}$ Second input area ulna side
$1_3$ Third input area
$1_{31}$ Third input area radius side
$1_{32}$ Third input area ulna side
2 Detecting unit
$2_1$ Key top
$2_2$ Force sensor
$2_3$ Parallel plate
$2_4$ Pressure-sensitive sensor
$2_5$ Pusher
3 Input unit
4 Database
5 Input information specifying module
6 Information presenting module
6a Information presenting device 7 Wiring board
8 Casing
9 Base
10 Information terminal
11 Slit
12 Column
a, d, f, i, k, n Detection data
b, e, g, j, m, o Accumulated data
c, h, Input information specified data

The invention claimed is:

1. An input device which outputs input information of electronic data corresponding to a physical quantity by detecting the physical quantity applied to a living body as an electric signal, comprising:
   a detecting unit which outputs the physical quantity applied to the living body as analog-quantity detection data; and
   an input information specifying module which collates data accumulated in a database with the detection data, and outputs the input information of the electronic data corresponding to the physical quantity based on a collation result thereof,
   wherein the database carries, as the accumulated data, a relation regarding a ratio of forces in a push-in direction and in a slide direction perpendicular to the push-in direction in the detecting unit, or a relation regarding tracing actions and changes in the ratio of forces in the push-in direction and in the slide direction perpendicular to the push-in direction in the detecting unit, or a relation regarding normalized gravity center position of load for the detecting unit and push-in position, or a relation regarding changes in the normalized gravity center position of load for the detecting unit and the tracing actions.

2. The input device as claimed in claim 1, wherein:
   the detecting unit detects the physical quantity transmitted via the living body as the electric signal, when it is in contact with a part of the living body and vicinity of a contact part of the living body is traced; and
   the input information specifying module collates the data accumulated in the database with the detection data, and outputs data allotted to a position by corresponding to the physical quantity as the input information of the electronic data based on the collation result.

3. The input device as claimed in claim 2, further comprising
   an information presenting module which displays the input information showing prescribed symbols, characters, or functions allotted to the positions in the living body.

4. The input device as claimed in claim 1, wherein:
   the detecting unit detects the physical quantity transmitted via the living body as the electric signal, when it is in contact with a part of the living body and vicinity of a contact part of the living body is traced; and
   the input information specifying module collates the data accumulated in the database with the detection data, and outputs data allotted to the action in the region by corresponding to the physical quantity as the input information of the electronic data based on the collation result.

5. The input device as claimed in claim 4, further comprising
   an information presenting module which displays the input information showing prescribed symbols, characters, or functions allotted to the actions.

6. The input device as claimed in claim 5, wherein
   the functions showing the input information include functions which show positions and actions of a pointer, scroll actions, or page turning actions.

7. The input device as claimed in claim 1, wherein
   the detecting unit is formed with: a force sensor which captures the physical quantity as a pushing force applied to a part of the living body and detects the pushing force as one-direction component or detects the pushing force by dividing it to a plural-direction components; a strain sensor which captures the physical quantity as a pushing force applied to a part of the living body and detects the pushing force as a force distribution of a plurality of points; or a plurality of force sensors disposed in a linear or surface-like manner.

8. The input device as claimed in claim 1, wherein
   the database carries, as the accumulated data, a relation regarding push-in positions and the detection data of the detecting unit configured with a force sensor which detects the force of one-direction component or a relation regarding tracing actions and changes in the detection data of the detecting unit configured with the force sensor which detects the force of one-direction component.

9. The input device as claimed in claim 1, wherein
   the accumulated data recorded in the database contains detection values for which specification of push-in positions are not conducted, as misjudgment preventing data when the input information specifying module specifies the push-in position.

10. The input device as claimed in claim 1, wherein the living body is a finger.

11. An information terminal equipped with an input device which outputs input information of electronic data, the input device outputting the input information of the electronic data corresponding to a physical quantity by detecting the physical quantity applied to a living body as an electric signal, wherein
    the input device comprises:
    a detecting unit which outputs the physical quantity applied to the living body as analog-quantity detection data; and
    an input information specifying module which collates data accumulated in a database with the detection data, and outputs the input information of the electronic data corresponding to the physical quantity based on a collation result thereof,
    wherein the database carries, as the accumulated data, a relation regarding a ratio of forces in a push-in direction and in a slide direction perpendicular to the push-in direction in the detecting step, or a relation regarding tracing actions and changes in the ratio of forces in the push-in direction and in the slide direction perpendicular to the push-in direction in the detecting step, or a relation regarding normalized gravity center position of load for the detecting unit and push-in position, or a relation regarding changes in the normalized gravity center position of load for the detecting unit and the tracing actions.

12. An input method for outputting input information of electronic data corresponding to a physical quantity by detecting the physical quantity applied to a living body as an electric signal, comprising:
    a detecting step which outputs the physical quantity applied to the living body as analog-quantity detection data; and
    an information outputting step which collates data accumulated in a database with the detection data, and outputs the input information of the electronic data corresponding to the physical quantity based on a collation result thereof, wherein the database carries, as the accumulated data, a relation regarding a ratio of forces in a push-in direction and in a slide direction perpendicular to the push-in direction in the detecting step, or a relation regarding tracing actions and changes in the ratio of forces in the push-in direction and in the slide direction perpendicular to the push-in direction in the detecting step, or a relation regarding normalized gravity center position of load for the detecting unit and push-in position, or a relation regarding changes in the normalized gravity center position of load for the detecting unit and the tracing actions.

13. The input method as claimed in claim 12, wherein:

in the detecting step, processing for detecting the physical quantity transmitted via the living body as the electric signal is executed, when being in contact with a part of the living body and vicinity of a contact part of the living body is traced; and in the information outputting step, processing for collating the data accumulated in the database with the detection data and for outputting data allotted to a position by corresponding to the physical quantity as the input information of the electronic data based on the collation result is executed.

14. The input method as claimed in claim 12, wherein:

in the detecting step, processing for specifying a region of the living body to which the physical quantity is applied and an action for applying the physical quantity to the living body and for outputting the action in the region based on the physical quantity as the analog-quantity detection data is executed; and in the information outputting step, processing for collating the data accumulated in the database with the detection data and for outputting data allotted to the action in the region by corresponding to the physical quantity as the input information of the electronic data based on the collation result is executed.

15. The input method as claimed in claim 14, which uses, as the database, a database that carries, as the accumulated data, a relation regarding push-in positions and the force of one-direction component detected in the detecting step or a relation regarding tracing actions and changes in the force of one-direction component detected in the detecting step.

16. The input method as claimed in claim 12, wherein:

a finger is used as the living body; the physical quantity at a position of the finger to which the physical quantity is applied is outputted as the analog-quantity detection data; or an action applied to the finger in a region of the finger to which the physical quantity is applied is outputted as the analog-quantity detection data.

17. The input method as claimed in claim 12, wherein in the detecting step, the physical quantity is: captured as a pushing force applied to a part of the living body and the pushing force is detected as one-direction component or detected by being divided to a plural-direction components; or captured as a pushing force applied to a part of the living body and the pushing force is detected as a force distribution of a plurality of points; or detected with a plurality of force sensors disposed in a linear or surface-like manner.

18. The input method as claimed in claim 12, which uses, as the database, a database that contains detection values for which specification of push-in positions are not conducted, as misjudgment preventing data for specifying the push-in position in the information specifying step.

* * * * *